(12) United States Patent
Takeuchi

(10) Patent No.: US 10,638,044 B2
(45) Date of Patent: Apr. 28, 2020

(54) IMAGE BLUR CORRECTION DEVICE, METHOD OF CONTROLLING SAME, AND IMAGING DEVICE

(71) Applicant: CANON KABUSHIKI KAISHA, Tokyo (JP)

(72) Inventor: Kenji Takeuchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/246,660

(22) Filed: Jan. 14, 2019

(65) Prior Publication Data
US 2019/0222760 A1 Jul. 18, 2019

(30) Foreign Application Priority Data

Jan. 18, 2018 (JP) .................................. 2018-006640

(51) Int. Cl.
*H04N 5/232* (2006.01)
*G02B 27/64* (2006.01)

(52) U.S. Cl.
CPC ....... *H04N 5/23258* (2013.01); *G02B 27/646* (2013.01); *H04N 5/2328* (2013.01); *H04N 5/23251* (2013.01); *H04N 5/23254* (2013.01); *H04N 5/23261* (2013.01); *H04N 5/23267* (2013.01); *H04N 5/23287* (2013.01)

(58) Field of Classification Search
CPC ............. H04N 5/2251; H04N 5/23229; H04N 5/23245; H04N 5/23251; H04N 5/23254; H04N 5/23258; H04N 5/23261; H04N 5/23267; H04N 5/2328; H04N 5/23287; H04N 5/357; H04N 19/139; G02B 27/646; G06T 7/207; G03B 5/00
See application file for complete search history.

(56) References Cited

U.S. PATENT DOCUMENTS 7,962,024 B2 * 6/2011 Tsuchihashi ......... G02B 27/646
396/55
8,896,716 B2 * 11/2014 Miyasako ............ G02B 27/646
348/208.1
9,031,396 B2    5/2015 Wakamatsu
(Continued)

FOREIGN PATENT DOCUMENTS

JP          05-232436 A    12/1993

*Primary Examiner* — Lin Ye
*Assistant Examiner* — Chriss S Yoder, III
(74) *Attorney, Agent, or Firm* — Cowan, Liebowitz & Latman, P.C.

(57) ABSTRACT

An image blur correction device detects a hand shake or the like using a shake detection unit and corrects image blur on the basis of a shake detection signal. An offset estimation unit estimates an offset component of an output of the shake detection unit. A noise term calculation unit separates an amount of shake detected by the shake detection unit into bands using a filter to calculate an amount of high frequency shake and an amount of low frequency shake. The noise term calculation unit performs control for changing characteristics of the offset estimation unit to delay updating of an offset estimation value as the amount of high frequency shake becomes larger and changing the characteristics of the offset estimation unit to advance the updating of the offset estimation value as the amount of low frequency shake becomes larger.

20 Claims, 19 Drawing Sheets

(56) References Cited

U.S. PATENT DOCUMENTS

2011/0194847 A1\* 8/2011 Wakamatsu ............. G03B 5/00
   396/55
2015/0029348 A1  1/2015 Miyasako
2015/0036007 A1  2/2015 Wakamatsu \* cited by examiner

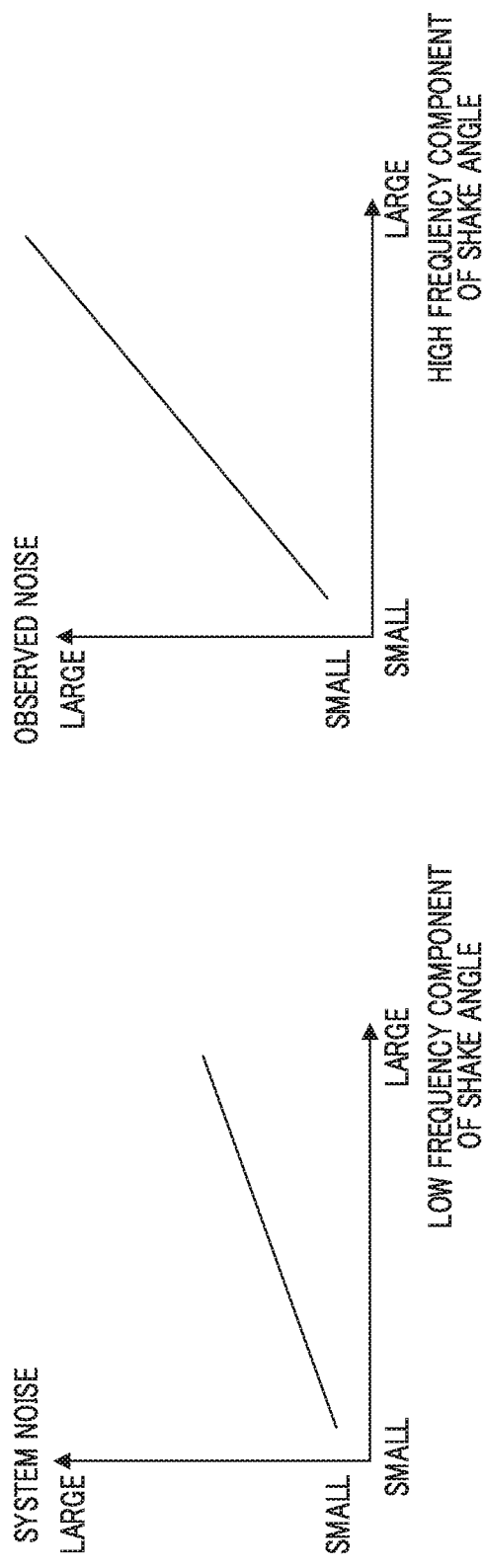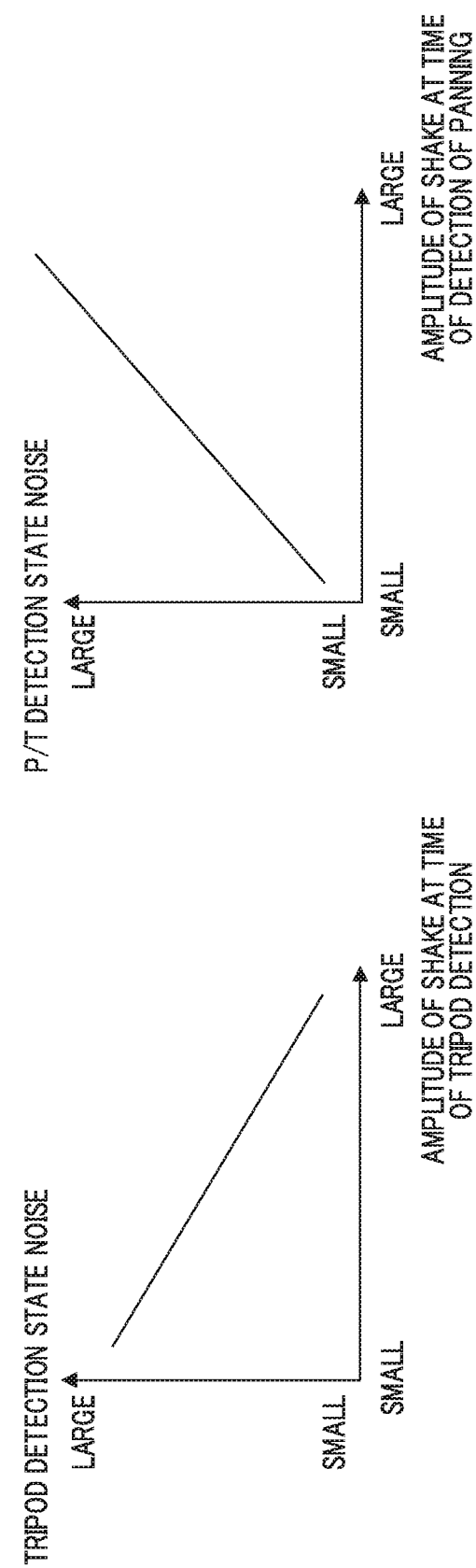

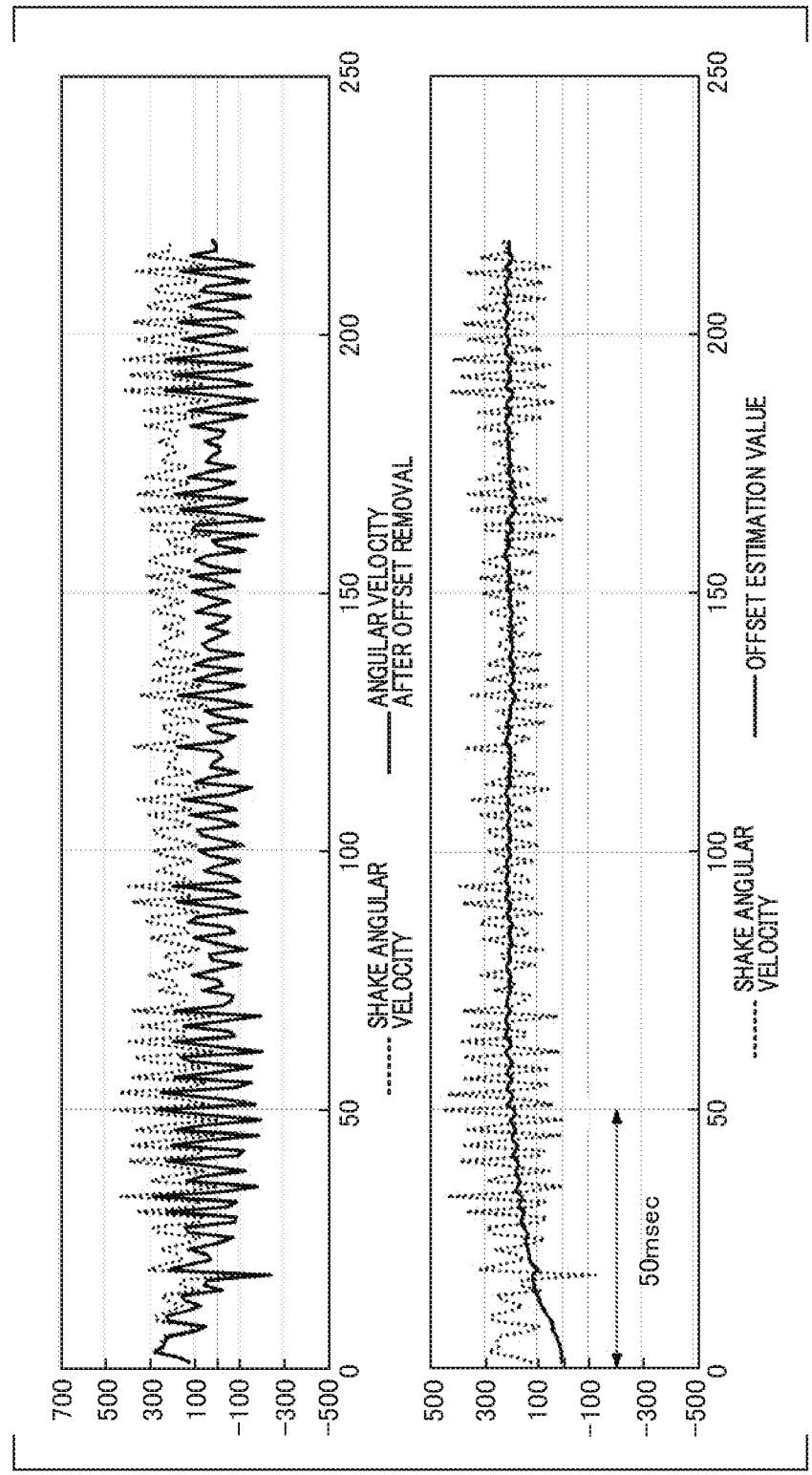

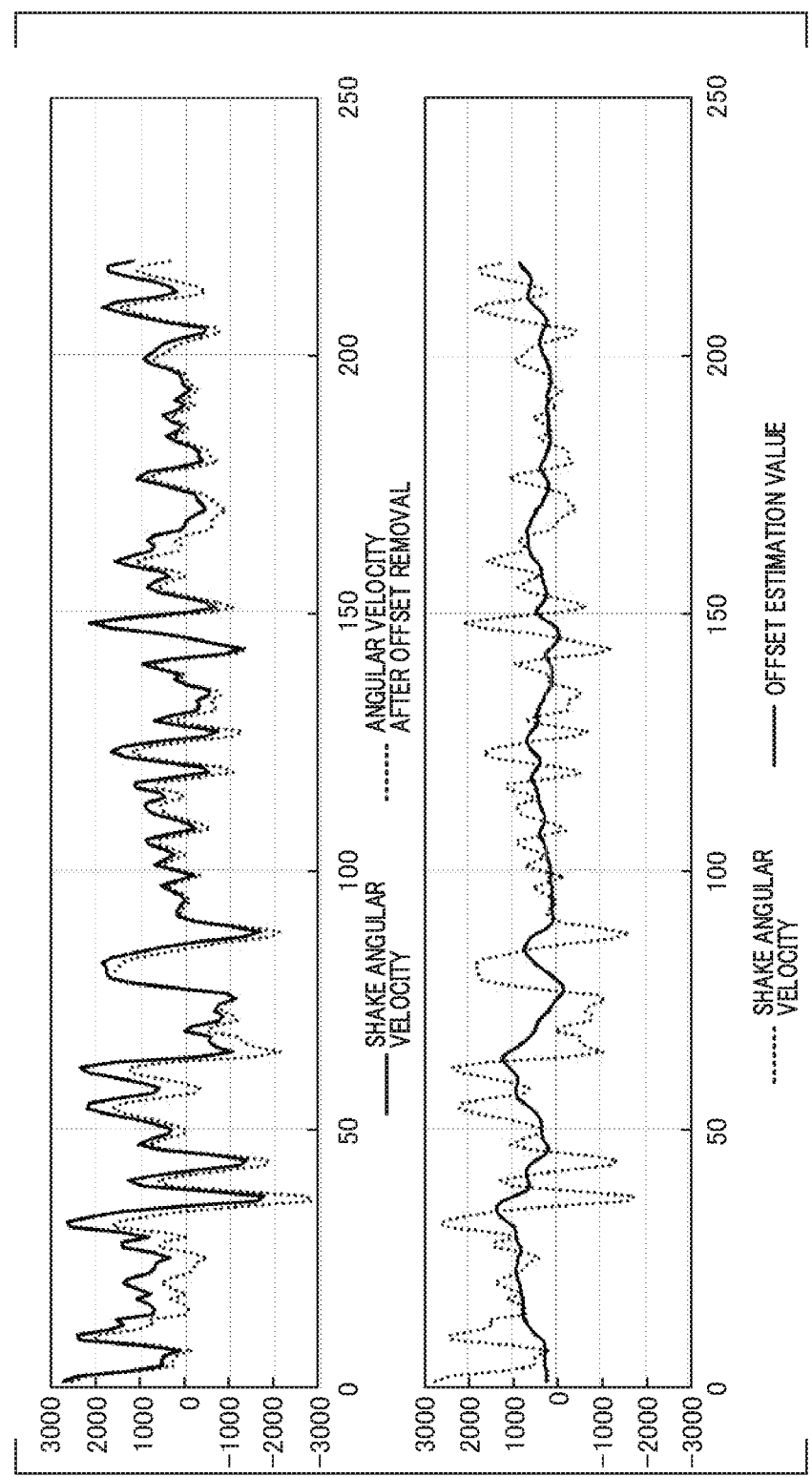

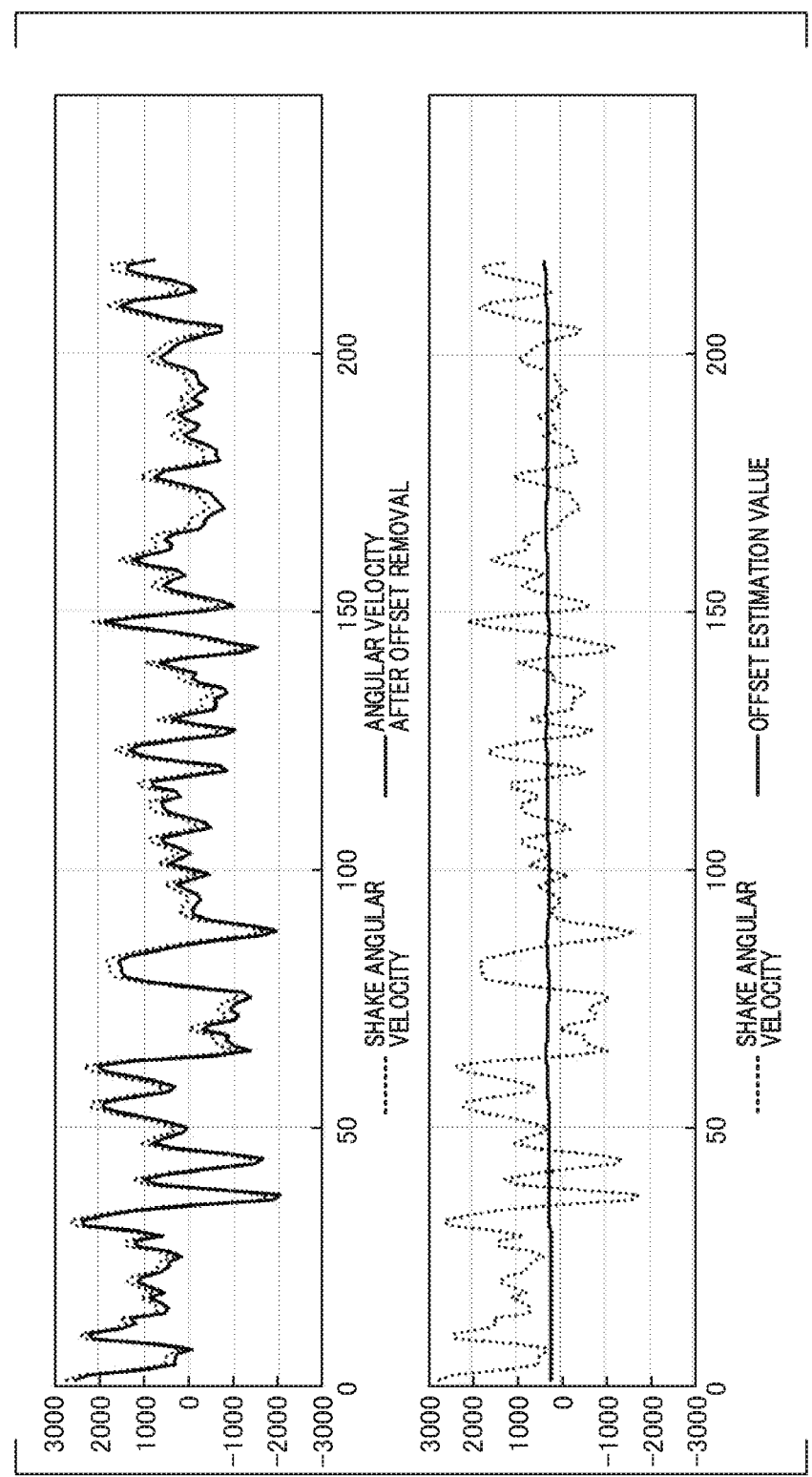

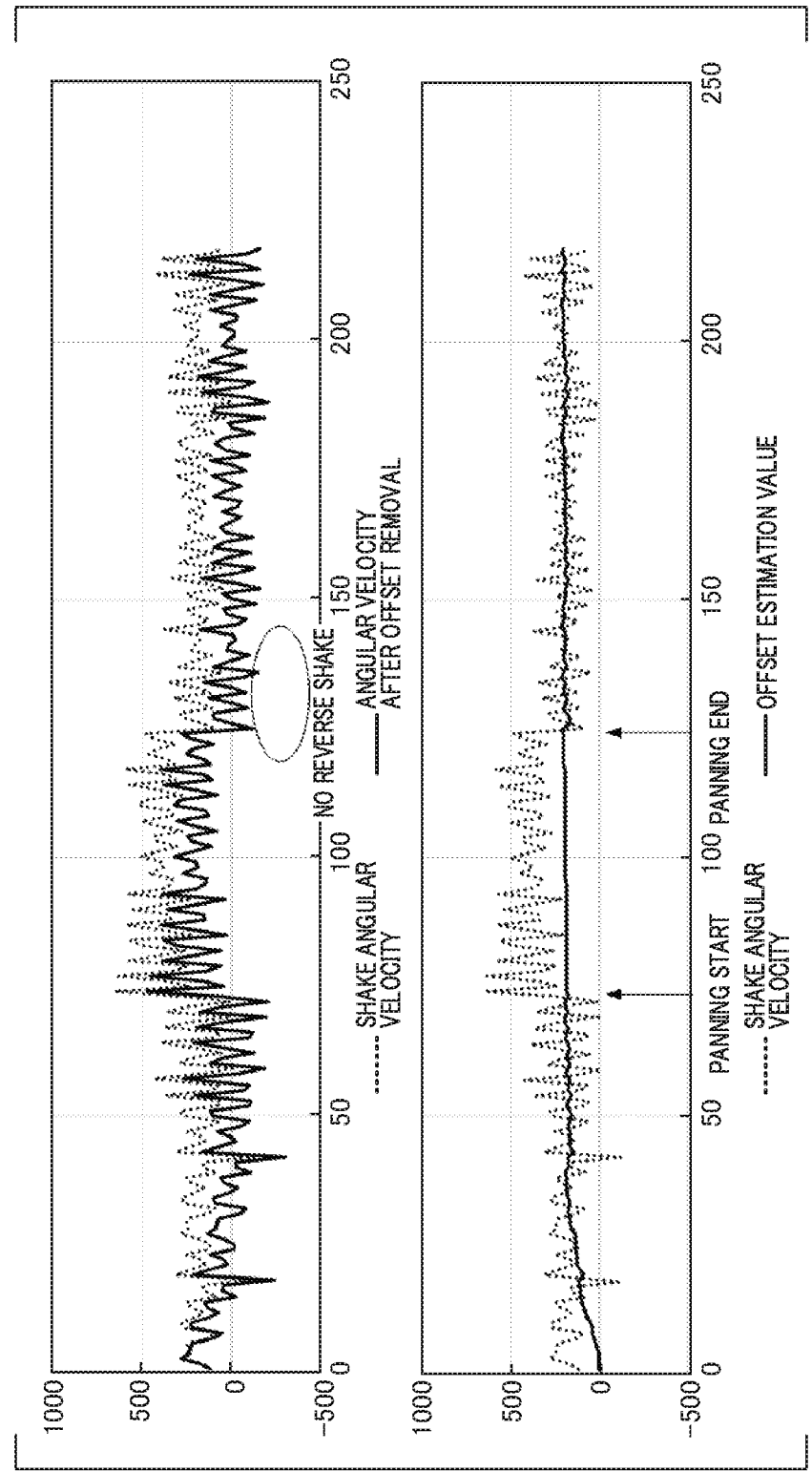

IMAGE BLUR CORRECTION DEVICE, METHOD OF CONTROLLING SAME, AND IMAGING DEVICE

BACKGROUND OF THE INVENTION

Field of the Invention

The present invention relates to an image blur correction process for a captured image.

Description of the Related Art

An image blur correction function is provided with respect to an event that an influence of a hand shake or the like on an image becomes large with miniaturization of an imaging device or an increase in magnification of an optical system. If an angular velocity sensor is used for detection of a shake of the imaging device, movement control of a shake correction lens (hereinafter simply referred to as a correction lens), an image sensor, or the like is performed according to an angular velocity detection signal. A direct current component (an offset component) such as a variation in reference voltage due to an individual difference is included in an output signal of the angular velocity sensor, and a drift occurs due to a change in temperature. Therefore, removing a low frequency component from the output signal of the angular velocity sensor using a high pass filter (hereinafter also referred to as an HPF) and suppressing degradation of image blur correction accuracy due to a low frequency error component is generally performed.

On the other hand, in the case of an operation in which an imaging direction of the imaging device is changed to one direction, such as panning or tilting (hereinafter referred to as panning or the like) that is performed by a user, a large number of low frequency components are included in an output of the angular velocity sensor. In image blur correction according to a shake detection signal, when a stroke range in which the correction lens or the like can be driven is exceeded, image blur correction performance is likely to be degraded. Therefore, a process of determining panning or the like on the basis of an output of the angular velocity sensor is performed. When the panning or the like is determined, a cutoff frequency of the HPF is changed to the higher frequency side, and therefore, control for suppressing image blur correction for a low frequency is performed. Japanese Patent Laid-Open No. H05-323436 discloses image blur correction control in a panning state or the like, in which correction of image blur at a high frequency is performed while suppressing a response of a low frequency.

In a method of removing an offset component using HPF disclosed in Japanese Patent Laid-Open No. H05-323436, the following phenomenon is likely to occur. It is necessary for the cutoff frequency of the HPF to be set to be as low as possible in order to perform good image blur correction on low frequency shake such as body swaying of a photographer while removing an offset component of an output of the angular velocity sensor. When the cutoff frequency of the HPF decreases, it takes a long time to completely remove the offset component due to an influence of a time constant of the filter. If an integral error (a drift error) has occurred in an angle signal by performing an integration process for converting an angular velocity signal to the angle signal without removing the offset component, the image blur correction performance is likely to be degraded for a long time. In addition, there is concern that the image blur correction performance immediately after panning may be degraded when a swing back phenomenon in which a signal in a direction opposite to a panning direction is generated occurs due to an influence of the HPF after a large swing has occurred in panning.

SUMMARY OF THE INVENTION

The present invention provides an image blur correction device that performs stable image blur correction in a wide frequency band even when a large shake occurs.

An image blur correction device of an aspect of the present invention includes an estimation unit configured to estimate an offset component of an output of a shake detection unit configured to detect a shake of an imaging device; a changing unit configured to calculate first and second amounts of shake that are a plurality of components in frequency bands on the basis of the output of the shake detection unit, and change characteristics of the estimation unit according to the first and second amounts of shake; and a control unit configured to perform image blur correction using an output obtained by subtracting the offset component estimated by the estimation unit from the output of the shake detection unit, wherein the changing unit changes the characteristics of the estimation unit into characteristics for delaying updating of an estimation value of the offset component of the estimation unit as the first amount of shake becomes larger, or changes the characteristics of the estimation unit into characteristics for advancing the updating of the estimation value of the offset component of the estimation unit as the second amount of shake that is a lower frequency component than the first amount of shake becomes larger.

According to the image blur correction device of the present invention, it is possible to perform stable image blur correction in a wide frequency band even when a large shake occurs.

Further features of the present description will be apparent from the following description of the example (with reference to the attached drawings).

BRIEF DESCRIPTION OF THE DRAWINGS

FIGS. 7A to 7D are diagrams illustrating a relationship between an evaluation value used for offset estimation and each noise.

FIGS. 8A and 8B are diagrams illustrating a relationship between an angular velocity output and an offset estimation value in a tripod detection state.

FIGS. 9A and 9B are diagrams illustrating a relationship between an angular velocity output and an offset estimation value in a hand held state.

FIGS. 10A and 10B are diagrams illustrating a relationship between an angular velocity output and an offset estimation value at the time of a panning operation.

DESCRIPTION OF THE EMBODIMENTS

Hereinafter, embodiments of the present invention will be described in detail with reference to the accompanying drawings. The present invention is applicable to video cameras, digital still cameras, optical instruments such as interchangeable lenses for the cameras, and electronic devices including an imaging unit.

First Embodiment

Figure 1A:
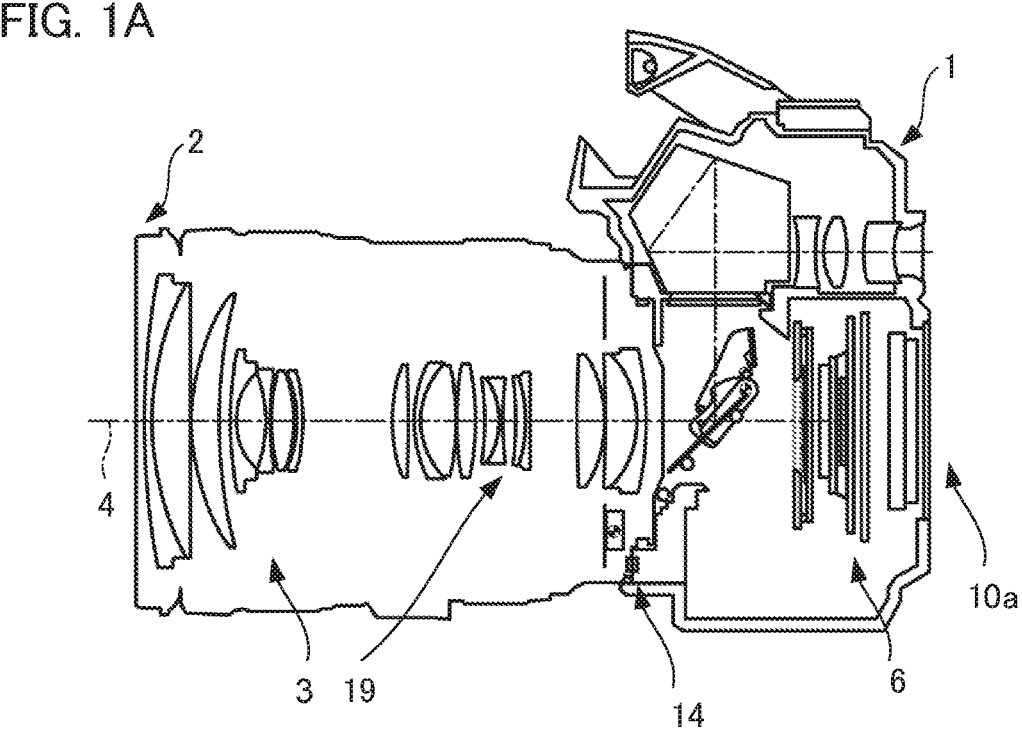
FIG. 1A is a central cross-sectional view of an imaging device of the present invention.
Figure 1B:
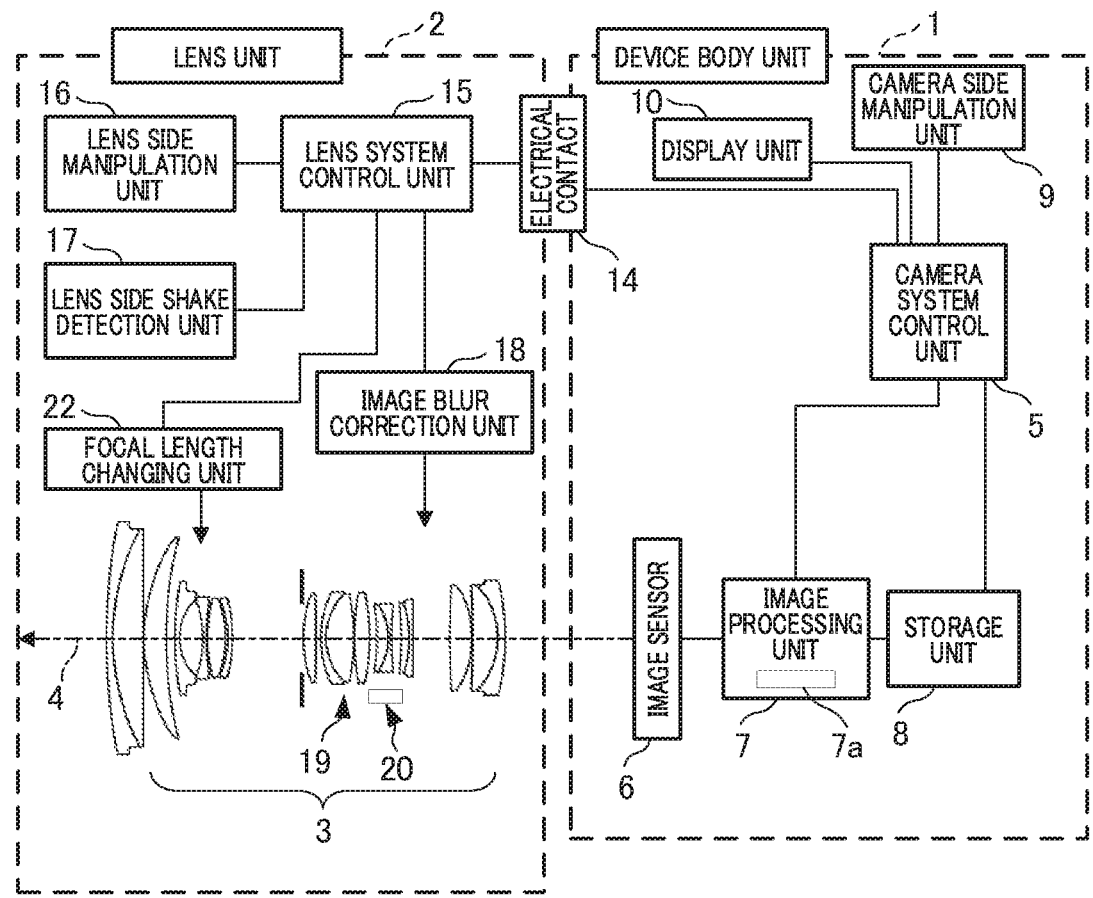
FIG. 1B is a block diagram illustrating an electrical configuration of the imaging device.

A first embodiment of the present invention will be described with reference to FIGS. 1A and 1B. FIG. 1A is a central cross-sectional view illustrating an overview of a configuration of an imaging device including an image blur correction device according to the first embodiment. FIG. 1B is a block diagram illustrating an electrical configuration of the imaging device. In the first embodiment, an example of an interchangeable lens type camera will be described. A positional relationship between respective units will be described in which a subject side is defined as the front side.

The imaging device 1 illustrated in FIG. 1A can perform imaging in a state in which a lens unit 2 is attached to a body of the imaging device 1 (hereinafter referred to as a device body unit). The lens unit 2 includes an imaging optical system 3 configured of a plurality of lenses, and an optical axis 4 indicates an optical axis of the imaging optical system 3. The correction lens unit 19 in the lens unit 2 includes a correction lens for correcting image blur of a captured image due to hand shake of the user or the like. The device body unit includes an image sensor 6 therein and a back surface display device 10a at a rear portion. Electrical contacts 14 electrically connect the device body unit and the lens unit 2.

In FIG. 1B, the device body unit includes a camera system control unit (hereinafter referred to as a camera control unit) 5, and the lens unit 2 includes a lens system control unit (hereinafter referred to as a lens control unit) 15. The camera control unit 5 and the lens control unit 15 can communicate with each other via the electrical contacts 14.

First, a configuration inside the lens unit 2 will be described. A lens side manipulation unit 16 includes a manipulation member that is operated by the user, and notifies the lens control unit 15 of a manipulation instruction of the user. A lens side shake detection unit (hereinafter referred to as a shake detection unit) 17 includes an angular velocity sensor, detects an amount of shake of the lens unit 2, and outputs a shake detection signal to the lens control unit 15. For example, rotation in a pitch direction, a yaw direction, and a roll direction with respect to the optical axis 4 of the imaging optical system 3 can be detected using a gyro sensor.

An image blur correction unit 18 performs driving control of the correction lens unit 19 according to a control command from the lens control unit 15 to correct image blur. The correction lens unit 19 includes a correction lens that is shift-driven or tilt-driven in a plane perpendicular to the optical axis 4, and a driving mechanism therefor. A lens position detection unit 20 performs position detection of the correction lens unit 19 and outputs a position detection signal to the lens control unit 15. A focal length changing unit 22 performs driving control of a zoom lens according to a control command from the lens control unit 15, and changes a focal length of the imaging optical system 3.

Next, a configuration inside the device body unit of the imaging device 1 will be described. The image sensor 6 constituting an imaging unit photoelectrically converts an optical image of a subject formed through the imaging optical system 3 and outputs an electric signal. Object light of the subject is formed as an image on an imaging plane of the image sensor 6 via the imaging optical system 3, and an amount of evaluation for focus adjustment or an appropriate amount of exposure is obtained in the image sensor 6. By adjusting the imaging optical system 3, it is possible to expose the image sensor 6 to the object light with an appropriate amount of light, and a subject image is formed in the vicinity of the image sensor 6.

The image processing unit 7 acquires an output signal of the image sensor 6, performs image processing, and stores image data in a storage unit 8. The image processing unit 7 includes, for example, an A (analog)/D (digital) converter, a white balance adjustment circuit, a gamma correction circuit, and an interpolation operation circuit therein, and generates image data for recording. The image processing unit 7 includes a color interpolation processing unit, and performs a process of color interpolation (demosaicing) from a Bayer array signal to generate color image data. Further, the image processing unit 7 performs data compression on images, moving images, sounds, and the like using a predetermined compression scheme. The image processing unit 7 compares a plurality of images acquired by the image sensor 6 and performs motion vector detection to acquire an amount of motion of the image. That is, the image processing unit 7 includes a motion vector calculation unit 7a that calculates a motion vector that is an amount of motion based on the captured image.

The camera control unit 5 performs overall control of the camera system including the device body unit and the lens unit 2. The camera control unit 5 controls the image processing unit 7 and the storage unit 8. A camera side manipulation unit 9 includes a manipulation member, and notifies the camera control unit 5 of a manipulation instruction of the user. The display unit 10 includes, for example, a back surface display device 10a, a small display panel (not illustrated) that displays imaging information, which is provided on an upper surface of the device body unit, and an electronic view finder (EVF). The display unit 10 performs an image display according to a control command from the camera control unit 5 to present image information or the like to the user. A process of recording and reproducing the image data is executed using the image processing unit 7 and the storage unit 8 under the control of the camera control unit 5. For example, captured image data is recorded on a recording medium or transmitted to an external device through an external interface.

Control of each component of the camera system is performed by the camera control unit 5 and the lens control unit 15, and still image imaging and moving image imaging can be performed according to a user manipulation. Each of the camera control unit 5 and the lens control unit 15 includes a central processing unit (CPU), and performs an operation control or a process of each component by executing a predetermined program. For example, the lens control unit 15 communicates with the camera control unit 5 and performs driving control of the correction lens unit 19, focus adjustment control according to driving of a focus lens (not illustrated), aperture control, zoom control, and the like.

The camera control unit 5 generates a timing signal or the like at the time of imaging, outputs the timing signal or the like to each constituent unit, and executes an imaging process, image processing, and a recording and reproduction process in response to a user manipulation. For example, if the user has manipulated a shutter release button included in the camera side manipulation unit 9, the camera control unit 5 detects a switch signal and controls the image sensor 6, the image processing unit 7, and the like. Further, the camera control unit 5 controls an information display device included in the display unit 10. In addition, the back surface display device 10a includes a touch panel in a display screen portion, detects a user manipulation, and notifies the camera control unit 5 of the user manipulation. In this case, the back surface display device 10a includes both of a manipulation function and a display function.

Next, an adjustment operation of the imaging optical system 3 will be described. The image processing unit 7 acquires an output signal of the image sensor 6 and obtains an appropriate focal position and aperture position of the imaging optical system 3 on the basis of a manipulation of the photographer with respect to the camera side manipulation unit 9. The camera control unit 5 transmits a control command to the lens control unit 15 via the electrical contacts 14. The lens control unit 15 appropriately controls the focal length changing unit 22 and the aperture driving unit (not illustrated) according to the control command from the camera control unit 5.

If an image blur correction mode is set, the lens control unit 15 starts control of image blur correction upon receiving a command for a transition to the image blur correction mode from the camera control unit 5. The lens control unit 15 acquires a shake detection signal from the shake detection unit 17, acquires a position detection signal from the lens position detection unit 20, and performs control of the image blur correction unit 18. The image blur correction unit 18 drives the correction lens unit 19, for example, using an actuator using a magnet and a flat coil. The lens position detection unit 20 includes, for example, a magnet and a Hall element. As a specific control method, first, the lens control unit 15 acquires the shake detection signal from the shake detection unit 17, and calculates an amount of driving of the correction lens unit 19 for performing image blur correction. The lens control unit 15 outputs the calculated amount of driving as a command value for the image blur correction unit 18 to drive the correction lens unit 19. Feedback control is performed so that a detection position of the lens position detection unit 20 follows the command value.

Figure 2:
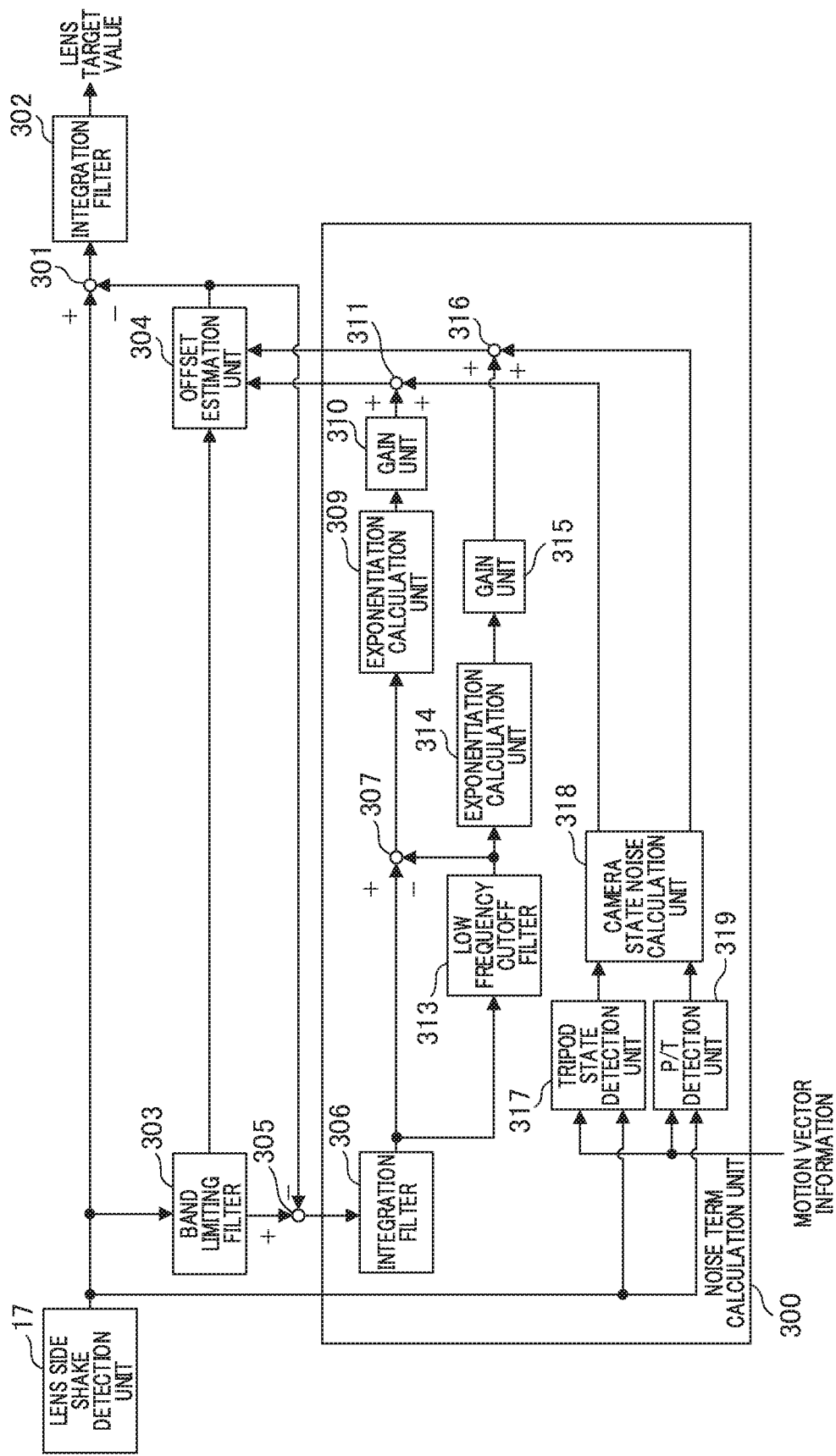
FIG. 2 is a block diagram illustrating a configuration of an image blur correction control unit according to a first embodiment.

FIG. 2 is a block diagram illustrating a configuration example regarding image blur correction control in the lens control unit 15. It should be noted that since the same configuration is adopted for each axis in the pitch direction, the yaw direction, and the roll direction as an image blur correction axis, only one axis will be described. Further, it is assumed that calculation that is performed by the adders 301, 305, 307, 311, and 316 includes addition (subtraction) of negative values.

In FIG. 2, the shake detection unit 17 outputs the shake detection signal to the adder 301, the band limiting filter 303, and the noise term calculation unit 300. The shake signal of which the band has been limited by the band limiting filter 303 is output to the offset estimation unit 304 and the adder 305. A signal indicating an estimation result of the offset estimation unit 304 is output to the adder 301 and the adder 305. An output of the adder 301 is integrated by the integration filter 302, and a driving target value of the correction lens is calculated. Hereinafter, a process of calculating the driving target value in the lens control unit 15, the noise term calculation unit 300, and the offset estimation unit 304 will be described in detail.

The lens control unit 15 acquires the shake detection signal from the shake detection unit 17, and generates a shake signal of which the band has been limited by the band limiting filter 303. Effect of the band limiting filter 303 will be described below with reference to FIG. 3.

The offset estimation unit 304 acquires the shake signal of which the band has been limited by the band limiting filter 303, and estimates an offset component of the output of the angular velocity sensor of the shake detection unit 17. The adder 301 subtracts an offset estimation value from the shake detection signal of the shake detection unit 17. The integration filter 302 integrates the angular velocity signal of the shake obtained by subtracting the offset estimation value, which is an output of the adder 301, to generate a shake angle signal. Using this signal as the driving target value, the image blur correction unit 18 drives the correction lens unit 19 so that the image blur correction operation is performed.

On the other hand, the adder 305 subtracts the offset estimation value of the offset estimation unit 304 from the shake signal of which the band has been limited by the band limiting filter 303. The integration filter 306 in the noise term calculation unit 300 integrates an output signal of the adder 305 to generate a shake angle signal for noise calculation.

In the first embodiment, a process of changing filter characteristics of the offset estimation unit 304 is performed on the basis of the shake angle signal for noise calculation. The offset estimation unit 304 includes a filter of which frequency characteristics is variable, and performs a process of estimating an offset component from the output signal of the band limiting filter 303. Therefore, if the offset estimation unit 304 can accurately estimate the offset component, the value calculated by the adder 305 is a shake signal without an offset component. In this case, the shake angle signal for noise calculation calculated by the integration filter 306 has a value centered on zero, which is a reference value. On the other hand, if the offset estimation unit 304 cannot accurately estimate the offset component, the value of the shake angle signal for noise calculation calculated by the integration filter 306 becomes a slowly drifted value due to an influence of an offset error in the shake detection signal.

The low frequency cutoff filter 313 acquires the shake angle signal for noise calculation from the integration filter 306, and extracts high frequency components by removing low frequency components. A cutoff frequency of the low frequency cutoff filter 313 is set to cut off a frequency band including the offset component, a low frequency fluctuation, and a drift component included in the output of the shake detection unit 17. By doing so, it is possible to separate the low-frequency offset component that is an estimation target and a high-frequency shake component generated due to actual shake from the shake detection signal from the shake detection unit 17.

The adder 307 subtracts the high frequency component output from the low frequency cutoff filter 313 from the shake angle signal for noise calculation (the output of the integration filter 306). Accordingly, the low frequency component of the shake angle signal is extracted. That is, it is possible to separate the shake angle signal for noise calculation into a low frequency component and a high frequency component. The exponentiation calculation unit 309 acquires an output of the adder 307 and calculates an absolute value by squaring the low frequency component of the shake angle signal for noise calculation. The gain unit 310 multiplies an output of the exponentiation calculation unit 309 by a predetermined gain. Accordingly, it is possible to mainly calculate an evaluation value of the low-frequency shake angle indicating a magnitude and a degree of influence of the offset component and the drift component of the low-frequency shake detection signal. Hereinafter, this evaluation value is called a system noise term.

On the other hand, the exponentiation calculation unit 314 acquires the output of the low frequency cutoff filter 313 and calculates an absolute value by squaring the high frequency component of the shake angle signal for noise calculation. The gain unit 315 multiplies an output of the exponentiation calculation unit 314 by a predetermined gain. Accordingly, it is possible to calculate an evaluation value of the high-frequency shake angle indicating a magnitude of the high-frequency shake detection signal. Hereinafter, this evaluation value is referred to as an observed noise term.

If the offset estimation value of the offset estimation unit 304 is not accurate, the low frequency component of the shake angle signal for noise calculation after integration drifts and increases, and therefore, the system noise term increases.

The tripod state detection unit 317 detects a state in which the shake of the imaging device 1 is small. For example, the tripod state detection unit 317 detects the amount of shake of the imaging device 1 using the detection signal of the shake detection unit 17 or the motion vector calculated by the motion vector calculation unit 7a of the image processing unit 7. If a state in which the amount of shake is smaller than a predetermined threshold value continues for a predetermined threshold time or more, it is determined that the imaging device is in a stationary state. The stationary state is a state in which the imaging device is attached to a tripod or the like and there is substantially no shake. If the tripod state detection unit 317 determines that the imaging device is in the stationary state, the tripod state detection unit 317 outputs a determination signal to the camera state noise calculation unit 318.

The camera state noise calculation unit 318 outputs a preset predetermined value as a tripod detection state noise to the adder 311. The adder 311 adds the system noise term as the output of the gain unit 310 and the tripod detection state noise.

The P/T detection unit 319 detects that a photographer is performing panning or the like. For example, the P/T detection unit 319 detects the amount of shake of the imaging device 1 using the detection signal of the shake detection unit 17 or the motion vector calculated by the motion vector calculation unit 7a of the image processing unit 7. If a state in which the amount of shake is larger than the predetermined threshold value continues for the predetermined threshold time or more, it is determined that the photographer has performed a composition change or the like through panning or tilting. If the P/T detection unit 319 determines that the imaging device is in a panning state or the like, the P/T detection unit 319 outputs a determination signal to the camera state noise calculation unit 318.

The camera state noise calculation unit 318 outputs a preset predetermined value as panning/tilting (P/T) detection state noise to the adder 316. The adder 316 adds the observed noise term which is the output of the gain unit 315 and the P/T detection state noise. The noise term calculation unit 300 outputs a signal of a noise term calculated by the adders 311 and 316 to the offset estimation unit 304. Details of an estimation process that is performed by the offset estimation unit 304 will be described below.

In the first embodiment, the detection signal of the shake detection unit 17 and the motion vector are used together in the tripod state detection and the detection of the panning or the like. Since a change in a slow motion such as panning which is difficult to detect using only the shake detection unit 17 can be calculated by a pixel-level matching comparison, it is possible to more accurately detect the shake of the imaging device.

Figure 3:
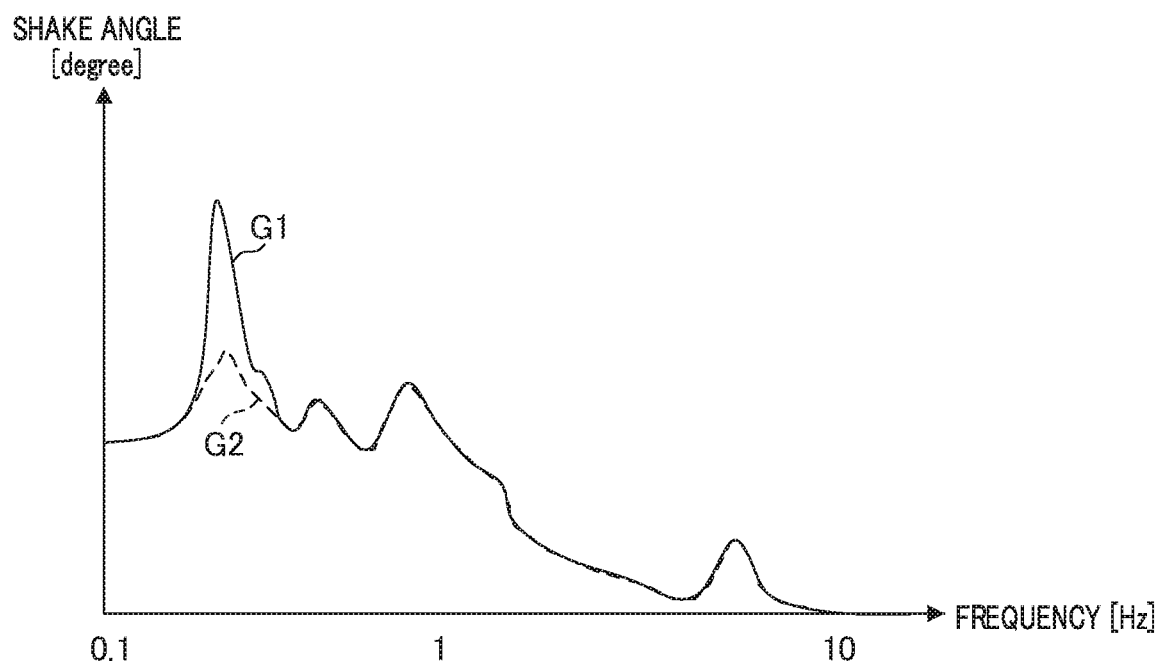
FIG. 3 is a diagram illustrating an example of a frequency spectrum of a hand shake angle.

Next, effects of the band limiting filter 303 will be described with reference to FIG. 3. FIG. 3 is a graph illustrating an axis of a frequency [Hz] on a horizontal axis and an axis of an amplitude [degree] of the shake angle on a vertical axis. A graph line G1 indicated by a solid line represents an example of frequency spectrum information (amplitude information with respect to the frequency) of a shake angle obtained by integrating the shake angular velocity information detected by the shake detection unit 17.

Generally, it is known that a frequency of a hand shake of a photographer is distributed in a range of 1 Hz to 10 Hz, an angle of the shake at a low frequency is large, and the shake angle becomes smaller as the frequency becomes higher. Whether or not there is large shake components in a specific frequency band differs depending on the photographer and an imaging state (imaging in a vehicle or a ship, imaging during walking, or the like), but large shake components are often present in somewhat the same frequency range regardless of the photographer in the same imaging situations. In the first embodiment, the offset estimation unit 304 accurately estimates the offset component with respect to the shake information detected by the shake detection unit 17. It is difficult to accurately estimate an offset component from a greatly fluctuating shake signal. In order to accurately estimate the offset component, it is preferable for large shake frequency components other than the offset component to be removed from the shake signal as much as possible. Therefore, a process of reducing a frequency component having a large spectral amplitude using a band limiting filter (more specifically, using a notch filter or the like) on the basis of shake frequency spectrum distribution information indicated by a solid line G1 in FIG. 3 is performed. Accordingly, accuracy of the estimation of the offset component can be improved.

There is also a method of attenuating all high frequency components other than the offset component using a low pass filter. However, in this method, a phase shift of a shake angle signal for noise calculation for changing the filter characteristics of the offset estimation unit 304 occurs due to a phase lag in a process of the low pass filter. Therefore, it is preferable for a notch filter in which an influence of a phase shift in other frequency bands is as small as possible to be used. Further, a target frequency and an attenuation factor of the notch filter may be changed according to an imaging situation. A graph line G2 indicated by a dotted line in FIG. 3 represents distribution characteristics of the frequencies of the hand shake when frequency components of the hand shake in a frequency band from 0.1 Hz to 1 Hz are reduced by the notch filter.

A process of calculating the driving target value in the lens control unit 15 will be described with reference to flowcharts of FIGS. 4 to 6. S2 and subsequent processes are repeatedly executed at constant cycles. In S1, the lens control unit 15 determines start of an operation at a predetermined cycle. When the start of the operation is determined, the process proceeds to S2. In step S2, the shake detection unit 17 detects shake. The shake detection unit 17 includes an angular velocity sensor and the like, and outputs a shake detection signal for image blur correction.

In S3, the lens control unit 15 determines whether a current time point is a time point corresponding to an acquisition cycle of the motion vector calculated by the motion vector calculation unit 7a in the image processing unit 7. If it is determined that the current time point corresponds to the acquisition cycle, the process proceeds to S4, and if it is determined that the current time point is not the acquisition cycle, the process proceeds to S5. In step S4, the motion vector is acquired. The motion vector calculation unit 7a analyzes a blur between frame images of an output video signal to detect the motion vector. Therefore, the acquisition cycle of the motion vector in S3 becomes a cycle corresponding to a frame rate (for example, 30 Hz or 60 Hz). On the other hand, if the current time point is not the time point corresponding to the acquisition cycle of the motion vector that is executed by the image processing unit 7 for each frame rate, the process proceeds to S5 and a motion vector acquired at a time point corresponding to a previous cycle is held.

In S6, the lens control unit 15 determines whether the current time point is a time point corresponding to an execution cycle of an offset estimation process. The execution cycle of the offset estimation process may match the acquisition cycle of the shake detection signal in S2 or may match the acquisition cycle of the motion vector in S3. Alternatively, although the offset estimation process may be executed at other cycles, the offset estimation process is executed at a long cycle to follow the purpose of estimating an extremely low frequency offset component, such that a calculation load of the estimation process can be reduced. In S6, if it is determined that the current time point is the time point corresponding to the execution cycle of the offset estimation process, the process proceeds to S7. On the other hand, if it is determined that the current time point is not the time point corresponding to the execution cycle of the offset estimation process, the process proceeds to S33 of FIG. 5. In S33, an offset estimation value estimated at a time point corresponding to a previous execution cycle of the offset estimation process is held, and then the process proceeds to S34.

In S7, the lens control unit 15 sets the frequency characteristics of the band limiting filter 303 for removing or attenuating the shake component at a specific frequency. This setting is performed on the basis of the frequency spectrum data of the shake according to the imaging state and the imaging condition. In S8, the band limiting filter 303 in which the frequency characteristics has been set in S7 removes the shake component in a specific frequency band from the shake detection signal from the shake detection unit 17. The output of the band limiting filter 303 is input to the adder 305.

In step S9, the adder 305 subtracts the offset estimation value (a stored value) estimated by the offset estimation unit 304 at the time of previous execution of the estimation process and stored in S33 from the shake signal from which the specific frequency component has been removed.

Then, in S10, the integration filter 306 integrates the shake signal calculated by the adder 305 to calculate the shake angle signal. A process of the integration filter 306 is a simple numerical integration process, but may be a pseudo integration process using a low pass filter. The pseudo integration process is an integration process in which low frequency components below a specific cutoff frequency are not integrated. If the offset estimation value subtracted from the shake signal by the adder 305 greatly deviates from a true offset value, the shake angle signal after the integration drifts greatly. Therefore, a calculated value of the system noise term or the observed noise term is likely to overflow in calculation. Accordingly, it is preferable for the pseudo integration process to be performed in order to reduce an amount of drift. Further, the offset estimation value of the offset estimation unit 304 is estimated to approach the true offset value over time, as will be described below. Therefore, a process of changing a cutoff frequency of pseudo integration to the low frequency side as the estimation of the offset estimation value progresses is performed.

In S11, the low frequency cutoff filter (high pass filter) 313 removes low frequency components from the shake angle signal and extracts high frequency components. In S12, the exponentiation calculation unit 314 squares the high frequency component of the shake angle signal. In step S13, the gain unit 315 sets a signal obtained by multiplying an output of the exponentiation calculation unit 314 by a predetermined gain as an evaluation value and holds the evaluation value as an observed noise term in step S14.

Figure 5:
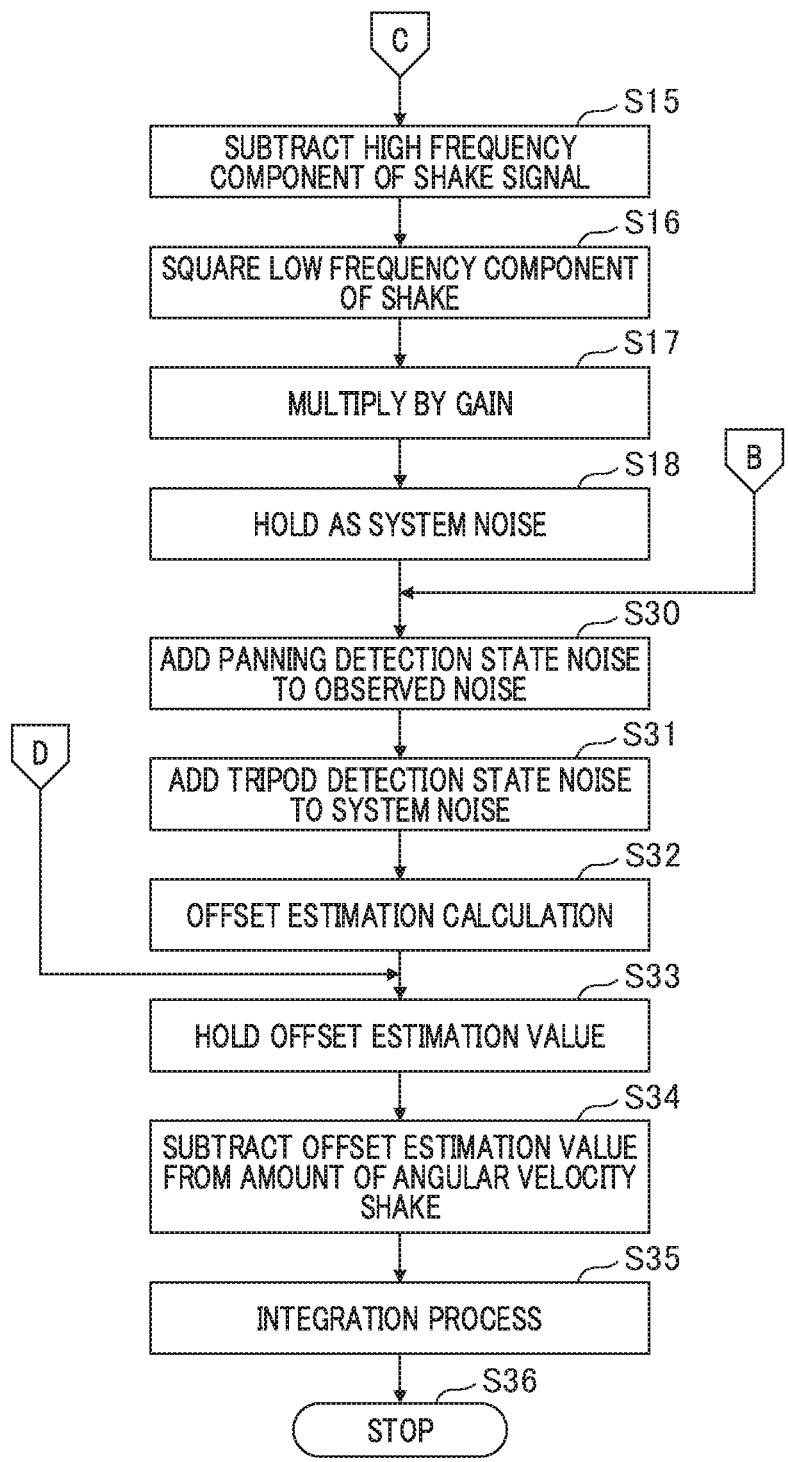
FIG. 5 is a flowchart illustrating a process subsequent to FIG. 4.

In S15 of FIG. 5, the adder 307 subtracts the high frequency component of the shake angle signal calculated by the low frequency cutoff filter 313 from the angular shake signal calculated by the integration filter 306 to calculate the low frequency component of the shake angle signal. In step S16, the exponentiation calculation unit 309 squares the low frequency component of the shake angle signal. In S17, the gain unit 310 sets a signal obtained by multiplying a predetermined gain in the output of the exponentiation calculation unit 309 as an evaluation value, and holds the evaluation value as a system noise term in S18.

Figure 4:
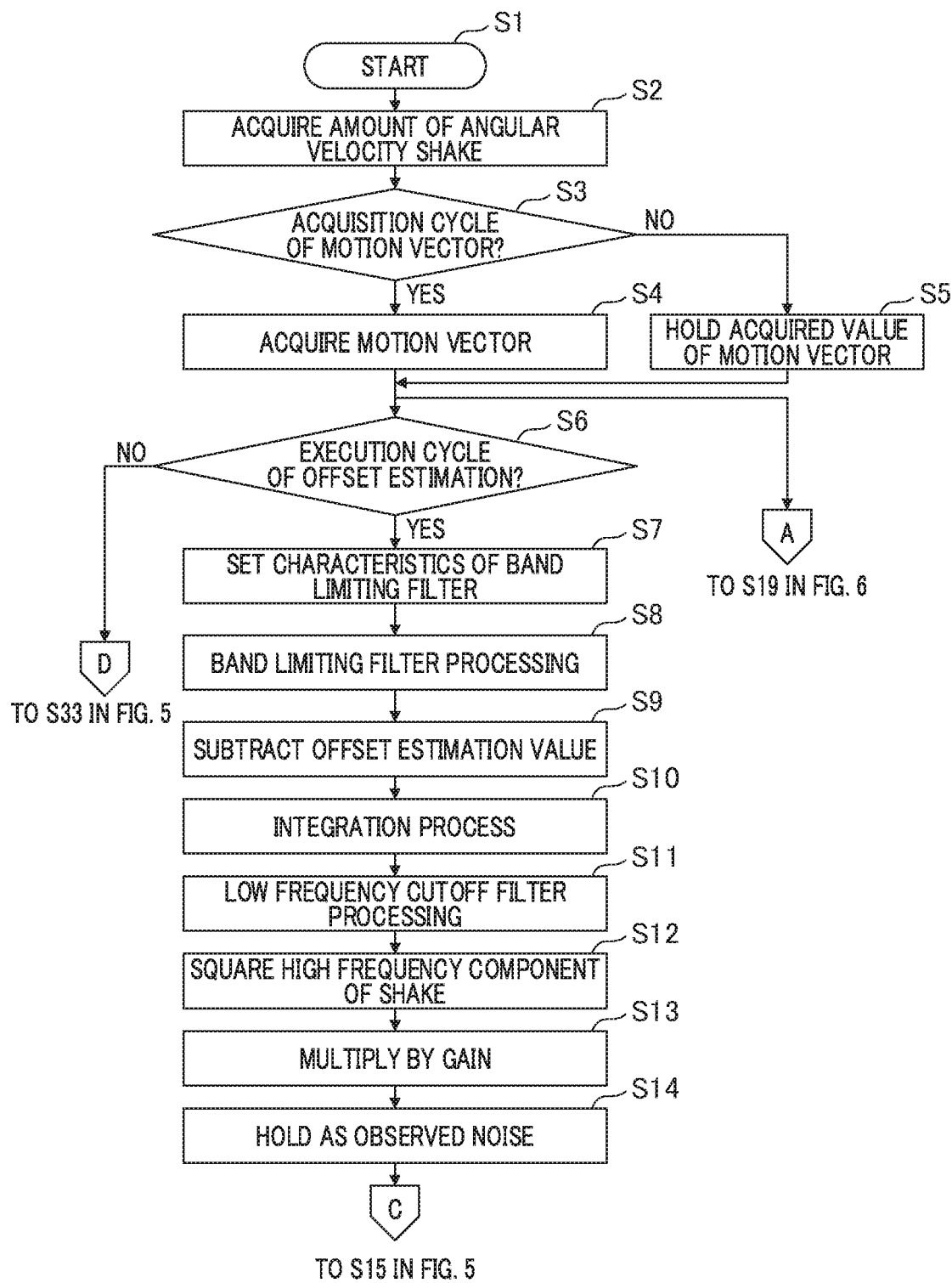
FIG. 4 is a flowchart illustrating target value calculation according to the first embodiment.
Figure 6:
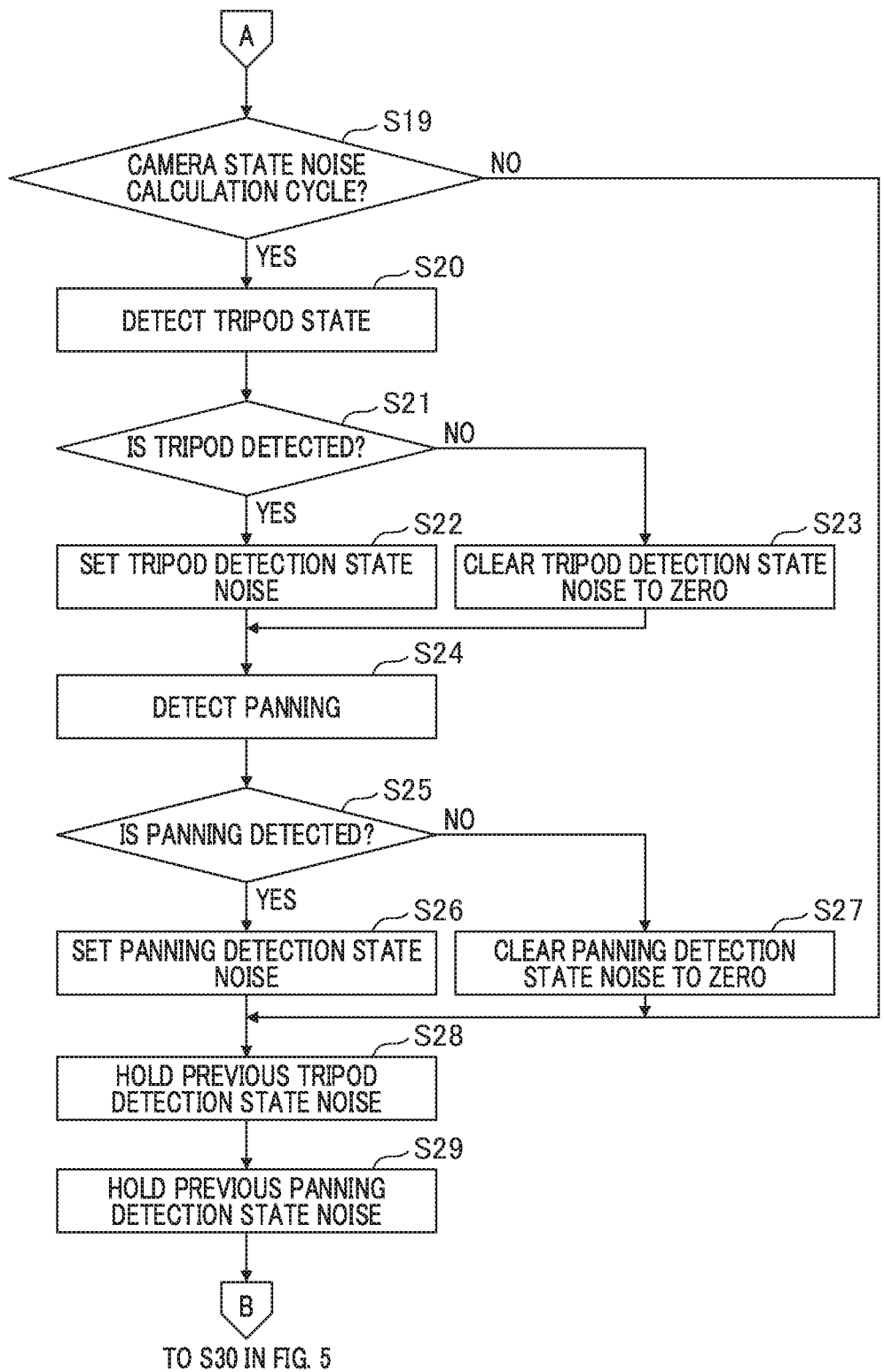
FIG. 6 is a flowchart for illustrating parallel processing subsequent to FIG. 4.

Processes of S19 to S29 in FIG. 6 are executed in parallel with the processes of S6 in FIG. 4 to S18 in FIG. 5. In S19, the lens control unit 15 determines whether or not a current time point is a time point corresponding to the cycle at which the camera state noise calculation process is executed. The cycle of the camera state noise calculation may be the same cycle as the offset estimation cycle or may be a cycle different from the offset estimation cycle. If it is determined in S19 that the current time point is not the time point corresponding to the camera state noise calculation cycle, the process proceeds to S28, and if it is determined that the current time point is the time point corresponding to the camera state noise calculation cycle, the process proceeds to S20.

In S20, the tripod state detection unit 317 determines whether the state in which the shake of the imaging device 1 is small continues for a threshold time or longer on the basis of the angular velocity of the shake acquired in S2 and the motion vector acquired in S4 to detect the tripod state. In S21, if the camera state noise calculation unit 318 determines that the stationary state such as a tripod detection state in which the imaging device is attached to a tripod is detected, the camera state noise calculation unit 318 proceeds to a process of S22, and if the camera state noise calculation unit 318 determines that the stationary state is not detected, the camera state noise calculation unit 318 proceeds to S23.

In S22, the camera state noise calculation unit 318 sets a predetermined value to the tripod detection state noise. Further, in S23, the camera state noise calculation unit 318 clears a value of the tripod detection state noise set until a previous calculation cycle, to zero. In S24, the P/T detection unit 319 detects a panning operation or a tilting operation on the basis of the angular velocity of the shake acquired in S2 and the motion vector acquired in S4. In S25, if it is determined that a panning state or the like is detected, the camera state noise calculation unit 318 proceeds to a process of S26, and if it is determined that the panning state or the like is not detected, the camera state noise calculation unit 318 proceeds to the process of S27.

In S26, the camera state noise calculation unit 318 sets a predetermined value in the detection state noise of panning or the like. In S27, the camera state noise calculation unit 318 clears the value of the detection state noise of panning or the like set until the previous calculation cycle, to zero.

In S28, the lens control unit 15 stores the value of the tripod detection state noise calculated in a previous camera state noise calculation cycle. In S29, the lens control unit 15 stores the value of the P/T detection state noise calculated in the previous camera state noise calculation cycle, and then, proceeds to S30 of FIG. 5. In S30, the adder 316 adds the observed noise term and the detection state noise of panning or the like. In S31, the adder 311 adds the system noise term and the tripod detection state noise. In S32, the offset estimation unit 304 performs offset estimation calculation on the basis of information calculated in S30 and S31.

In S33, the lens control unit 15 holds the offset estimation value calculated by the offset estimation unit 304 in S32. In S34, the adder 301 subtracts the offset estimation value from the angular velocity of the shake. In S35, the integration filter 302 performs an integration process to generate a shake angle signal, thereby generating a target value for image blur correction control. A filtering process that is performed by the integration filter 302 may be a pseudo integration process of changing the cutoff frequency of the pseudo integration to the low frequency side as the estimation of the offset estimation value progresses, as in the integration filter 306. In S36, the lens control unit 15 ends the process of calculating the target value at a current calculation cycle.

Next, the process of estimating the offset of the output of the shake detection unit 17 that is performed by the offset estimation unit 304 in S32 will be described using equations. If the offset estimation unit 304 is configured of a linear Kalman filter, the linear Kalman filter can be expressed by Equations (1) to (7) below.

$$x_t = Ax_{t-1} + Bu_t + \varepsilon_t \tag{1}$$

$$z_t = Cx_t + \delta_t \tag{2}$$

Equation (1) represents an operation model in a state space representation, and Equation (2) represents an observation model. Meanings of respective symbols are as follows.

A: System matrix in the operation model
B: Input matrix
C: Output matrix in the observation model
$\varepsilon_t$: Process noise
$\delta_t$: Observed noise
t: Discrete time.

$$\hat{x}_t^- = A\hat{x}_{t-1} + Bu_t \tag{3}$$

$$\hat{x}_t^- = A\hat{x}_{t-1} + Bu_t \tag{4}$$

Equation (3) represents a priori estimation value in the prediction step, and Equation (4) represents a priori error covariance. Further, $\Sigma_x$ represents variance of the noise of the operation model.

$$K_t = \frac{\hat{P}_t^- C^T}{(C\hat{P}_t^- C^T + \Sigma_z)} \tag{5}$$

$$\hat{x}_t = \hat{x}_t^- + K_t(z_t - C\hat{x}_t^-) \tag{6}$$

$$\hat{P}_t = (I - K_t C)\hat{P}_t^- \tag{7}$$

Equation (5) represents a calculation equation of the Kalman gain in a filtering step, and a superscript T indicates a matrix transposition. Further, Equation (6) represents a posteriori estimation value of the Kalman filter, and Equation (7) represents a posteriori error covariance. Further, $\Sigma_z$ indicates a variance of noise of the observation model.

In the first embodiment, the offset value is set as $x_t$ and the observed amount of shake is set as $z_t$ in order to estimate an offset component of the shake detection unit 17. A model of the offset component can be expressed by a first-order linear model equation below, in which there is no input term $u_t$ in Equation (1) and A=C=1 in Equations (1) and (2).

$$x_t = x_{t-1} + \varepsilon_t \tag{8}$$

$$z_t = x_t + \delta_t \tag{9}$$

The variance $\Sigma_x$ of the noise of the operation model in Equation (4) is expressed by a sum of the system noise $\sigma_x$ and the tripod detection state noise $\sigma_t$. Further, the variance $\Sigma_z$ of the noise of the observation model in Equation (5) is represented by a sum of the observed noise $\sigma_z$ and the P/T (panning/tilting) detection state noise $\sigma_p$.

Further, a priori offset estimation value is expressed by:

$$\hat{x}^-,$$

and the error covariance estimation value at time t is expressed by:

$$\hat{P}_t$$

The Kalman gain at time t is denoted as $k_t$. The observed noise is denoted as $\sigma_z$, the P/T detection state noise is denoted as $\sigma_p$, the amount of shake observed by the shake detection unit 17 is denoted as $z_t$, and the Kalman filter can be configured by the following equation.

$$\hat{x}_t^- = \hat{x}_{t-1} \tag{10}$$

$$\hat{P}_t^- = \hat{P}_{t-1} + \sigma_x + \sigma_t \tag{11}$$

$$k_t = \frac{\hat{P}_t^-}{(\hat{P}_t^- + \sigma_z + \sigma_p)} \tag{12}$$

$$\hat{x}_t = \hat{x}_t^- + k_t(z_t - \hat{x}_t^-) \tag{13}$$

$$\hat{P}_t = (I - k_t)\hat{P}_t^- \tag{14}$$

The offset estimation unit 304 is configured using calculation equations including Equations (10) to (14).

$$\hat{x}_{t-1}$$

is an offset estimation value at time t−1 of an updating cycle of the estimation calculation. A priori offset estimation value at time t:

$$\hat{x}_t^-$$

is obtained from the offset estimation value.

Using the system noise $\sigma_x$ output by adder 311, the tripod detection state noise $\sigma_t$, and the error covariance estimation value at time t−1:

$$\hat{P}_{t-1},$$

a priori error covariance estimation value at time t:

$$\hat{P}_t^-$$

is calculated.

The Kalman gain $k_t$ is calculated on the basis of the a-priori error covariance estimation value, the observed noise $\sigma_z$, and the P/T detection state noise $\sigma_p$. The a priori offset estimation value is corrected using a value obtained by multiplying an error between the observed amount of shake $z_t$ and the a priori offset estimation value:

$$\hat{x}_t^-$$

by the Kalman gain $k_t$ using Equation (13), and the offset estimation value:

$$\hat{x}_t$$

is calculated.

Further, the a-priori error covariance estimation value:

$$\hat{P}_t^-$$

is corrected using Equation (14) and the error covariance estimation value $$\hat{P}_t$$

is calculated. The a-priori estimation updating and correction is repeated at each operation cycle using these calculations, thereby calculating the offset estimation value.

A change in an offset estimation operation due to a change in magnitude of each noise in the Kalman filter configured as described above will be described using Equations (11), (12), and (13), and FIGS. 7A to 7D. The respective noises are the system noise $\sigma_x$, the observed noise $\sigma_z$, the tripod detection state noise $\sigma_t$, and the P/T detection state noise $\sigma_p$. FIGS. 7A to 7D are diagrams illustrating a relationship between a magnitude of the shake and a magnitude of each noise according to an imaging state.

FIG. 7A is a graph illustrating a relationship between the low frequency component of the shake angle signal on a horizontal axis and the system noise on a vertical axis. As the low frequency component increases in the shake angle signal calculated by the integration filter 306, the system noise $\sigma_x$ increases. This means that there is an offset error in the output of the shake detection unit 17, and the offset estimation value subtracted by the adder 305 is not a true offset value. That is, this indicates that a drift of the low frequency component of the shake angle signal for noise calculation after integration of the integration filter 306 is large since there is still an error with respect to the true offset value. This indicates that the offset estimation unit 304 is in a state in which the offset estimation unit 304 cannot accurately estimate the offset.

FIG. 7C is a graph illustrating a relationship between an amplitude of the shake at the time of tripod detection on a horizontal axis and a tripod detection state noise on a vertical axis. The tripod detection state noise increases as a shake at the time of tripod detection in the tripod state detection unit 317 becomes smaller. This indicates that the imaging device 1 is in a stationary state in which the imaging device 1 is placed on a tripod.

In Equation (11), a value of the a-priori error covariance estimation value:

$$\hat{P}_t^-$$

becomes larger due to the system noise and tripod detection state noise. Considering a state when the observed noise and the detection state noise of panning or the like do not change, the Kalman gain $k_t$ calculated using Equation (12) approaches 1 as a ratio of a value of a numerator to a denominator of the calculation equation becomes higher. Conversely, the Kalman gain $k_t$ calculated using Equation (12) approaches zero as the system noise and the tripod detection state noise become smaller.

From the above, the offset estimation value calculated using Equation (13):

$$\hat{x}_t$$

is corrected to approach the observed amount of shake $z_t$ as the Kalman gain $k_t$ approaches 1, and is updated to maintain the a priori offset estimation value:

$$x_t^-$$

as the Kalman gain $k_t$ approaches 0.

With such an operation, when the offset error of the output of the shake detection unit 17 is large or when the offset estimation value has an error from a true offset value, the Kalman gain approaches 1 in the offset estimation calculation in S32. This functions to update the offset estimation value so that an error between the observed amount of shake and the estimated value is corrected using Equation (13). As an amount of low frequency shake (system noise $\sigma_x$) becomes larger, characteristics of the offset estimation unit 304 are changed so that the updating speed of the offset estimation becomes higher.

Further, as the amplitude of the shake in the tripod detection state becomes smaller, a noise variance of the operation model in Equation (11) becomes further larger and the Kalman gain approaches 1. This functions so that the offset estimation value approaches the observed amount of shake. This is because, when the shake is small in a tripod detection state, a frequency component of the shake due to actual shake of the photographer is not included in the observed amount of shake, and therefore, a low frequency component of the observed amount of shake mainly includes an offset component and accuracy of the offset estimation is high. Therefore, an updating process is actively performed so that the estimation value of the offset approaches the observed amount of shake.

FIG. 7B is a graph illustrating a relationship between the high frequency component of the shake angle signal on a horizontal axis and the observed noise on a vertical axis. The observed noise $\sigma_z$ increases as the high frequency component in the shake angle signal calculated by the integration filter 306 becomes larger. This indicates that a high frequency component including a frequency band of the hand shake in the amount of shake detected by the shake detection unit 17 is large. That is, this indicates that the imaging device 1 is held under imaging conditions with a large shake such as imaging during walking.

FIG. 7D is a graph illustrating a relationship between the amplitude of the shake at the time of detection of panning or the like on a horizontal axis and the P/T detection state noise on a vertical axis. As the amplitude of the shake at the time of panning detection in the P/T detection unit 319 becomes larger, the P/T detection state noise increases. This indicates that the photographer performs a panning operation or a tilting operation to intentionally change a composition and the shake of the imaging device 1 is large. The determination as to the panning operation or the like can be substituted by a determination as to the observed noise in that the shake is large. However, the first embodiment has an advantage that the detection accuracy of the motion change is high, as compared with a case in which only the magnitude of the shake is simply detected with respect to a motion for a predetermined time in a certain direction such as a panning operation.

In a state in which the system noise and the tripod detection state noise do not change, a priori estimated error covariance value $$\hat{P}_t^-$$

in Equation (11) does not change. When the observed noise and the P/T detection state noise increase, the Kalman gain $k_t$ calculated using Equation (12) approaches 0 since a ratio of a denominator value to a numerator of the calculation equation becomes higher. Conversely, as the observed noise and the P/T detection state noise become smaller, the Kalman gain $k_t$ calculated using Equation (12) approaches 1. From the above, the offset estimation value calculated using Equation (13), $$\hat{x}_t$$

is corrected to approach the observed amount of shake $z_t$ as the Kalman gain $k_t$ approaches 1. As the Kalman gain $k_t$ approaches 0, the a priori offset estimation value is updated to maintain:

$$\hat{x}_t^-$$

With such an operation, as the amount of shake detected by the shake detection unit 17 becomes larger, the Kalman gain approaches 0 due to the offset estimation calculation in S32. This functions to delay updating of the offset estimation value (or not update the offset estimation value) so that the error between the observed amount of shake and the estimation value is not corrected using Equation (13). The characteristics of the offset estimation unit 304 is changed so that the updating speed of the offset estimation is low as the amount of high frequency shake (observed noise $\sigma_z$) becomes larger.

Similarly, when the panning operation or the like is detected, the variance of the noise of the observation model in Equation (12) becomes further larger and the Kalman gain approaches 0, which functions to delay updating of the offset estimation.

The offset estimation unit 304 operates as described above, thereby avoiding a shake component due to a motion of the photographer being erroneously extracted as the offset component even under imaging conditions in which a large shake is included in the amount of shake detected by the shake detection unit 17 due to the motion of the photographer. That is, the offset estimation can be performed accurately regardless of imaging conditions or an imaging state. In addition, a process of advancing the updating of the offset estimation value in the stationary state of the imaging device like the tripod detection state is performed. A process of advancing the updating of the offset estimation in a state in which an error between the offset estimation value and the true offset value is large, for example, immediately after power is supplied to the imaging device 1 is performed. It is possible to improve the image blur correction performance by avoiding inaccurate estimation while increasing the speed until the offset estimation is completed.

Figure 8A:
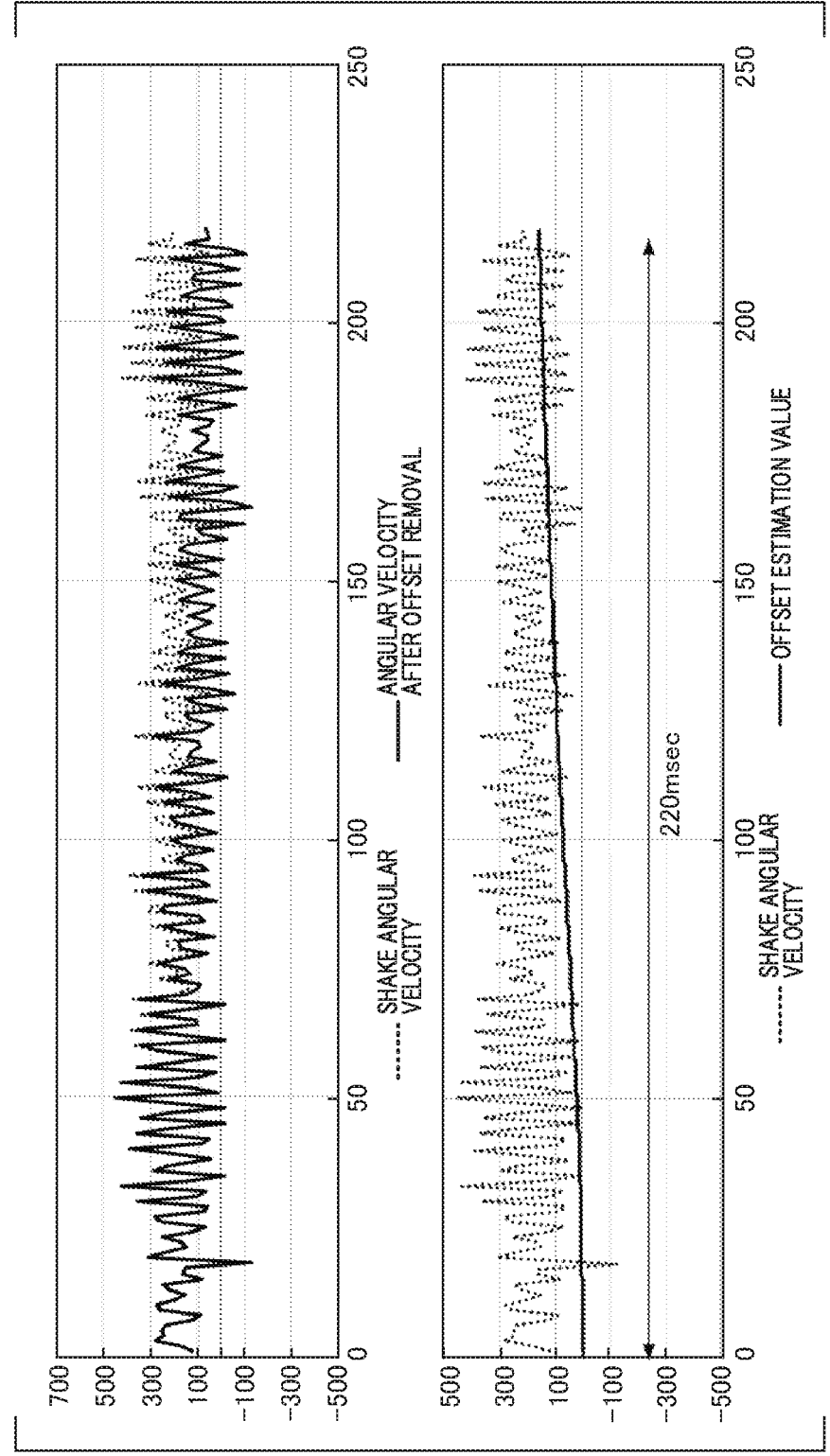

An example of a time series change in the offset estimation value in each imaging situation will be shown with reference to FIGS. 8 to 10. FIGS. 8A and 8B illustrates a temporal change in the shake angular velocity, the angular velocity after offset removal, and the offset estimation value in the tripod detection state of the imaging device 1, that is, the stationary state. A horizontal axis is a time axis and is indicated in units of milliseconds (msec). A vertical axis indicates an angular velocity signal of the shake from the shake detection unit 17, the offset estimation value, and the angular velocity signal of the shake after the offset estimation value is subtracted.

FIG. 8A illustrates a waveform example when the offset component of the shake detection unit 17 is extracted by a low pass filter having a fixed cutoff frequency and is removed, as a comparative example. FIG. 8B illustrates an example of a waveform in the first embodiment. In the comparative example, the offset component is estimated using a low pass filter having an extremely low cutoff frequency (for example, 0.01 Hz) in order to improve low frequency performance of the image blur correction. Therefore, a time of about 220 msec is taken to remove the offset component as illustrated in FIG. 8A and the image blur correction performance is likely to be degraded until the offset component can be correctly removed. On the other hand, in the first embodiment, the updating of the offset estimation value is advanced according to a determination result of determining that the imaging device is in the stationary state through the tripod state detection or a determination result of determining that an error between the offset estimation value and a true value is large. It can be seen that a time taken to correctly remove the offset component is about 50 msec as illustrated in FIG. 8B and is shorter than in the comparative example.

FIGS. 9A and 9B illustrate examples of waveforms under imaging conditions with a large shake such as imaging during walking. A horizontal axis and a vertical axis are set, as in FIGS. 8A and 8B. FIG. 9A illustrates a waveform example in a comparative example. In order to prevent striking a control end of a shake correction member (a correction lens or the like) (hereinafter referred to as end contact) in a state in which the shake is large, a cutoff frequency of the low pass filter that removes low frequency components is set to be higher than that in a stationary state. Therefore, the offset estimation value due to the low pass filter becomes an offset estimation value that greatly fluctuates in an amplitude direction in time series, which includes not only the offset component having a constant value to be removed, but also frequency components due to a shake at the time of imaging. As a result, since frequency components other than the offset component which is a shake component to be essentially subjected to the image blur correction are removed from the shake detection value, the image blur correction performance is degraded.

FIG. 9B illustrates an example of a waveform in the first embodiment. When the magnitude of the high frequency component of the shake is determined and occurrence of a large shake is detected, a process of delaying the updating of the offset estimation is performed. The offset estimation unit 304 can estimate only a frequency of the offset component. As a result, an angular velocity after offset removal can remove only the offset component without attenuating the shake frequency component occurring at the time of imaging, and therefore, image blur correction performance is not degraded.

Figure 10A:
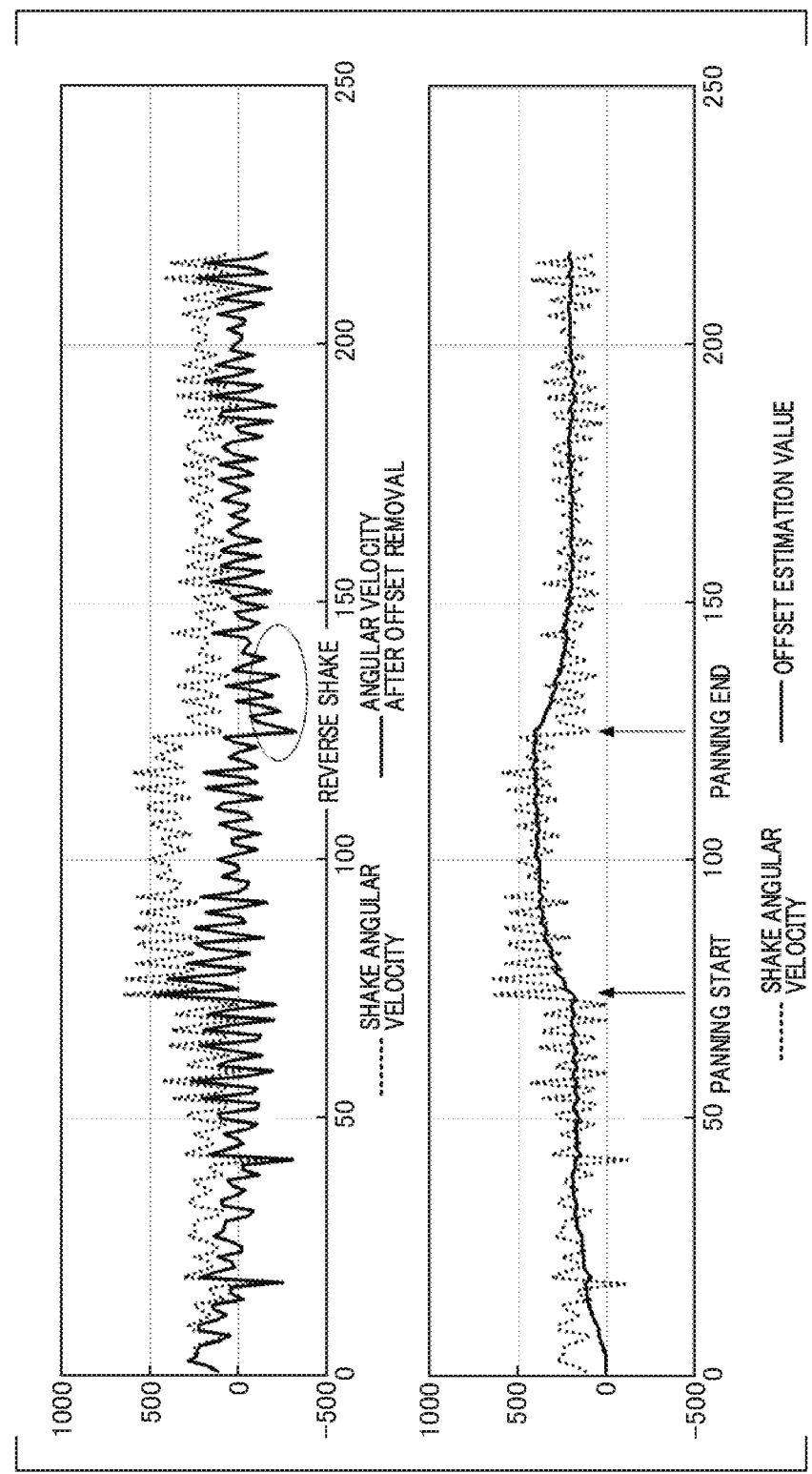

FIGS. 10A and 10B illustrate examples of waveforms when the photographer changes a composition through a panning operation. A horizontal axis and a vertical axis are set, as in FIGS. 8A and 8B. FIG. 10A illustrates a waveform example in a comparative example. An assumed panning operation of the photographer is an operation in which the imaging device is moved in a predetermined direction around 70 msec in a time axis of the graph and is stopped in the vicinity of 120 msec. Although the image blur correction can be satisfactorily performed in a stationary state in the comparative example, a change in angular velocity during the panning is erroneously extracted as the offset component simultaneously with the start of the panning operation. It takes time to return to a correct offset component after the panning operation is stopped. Therefore, an angular velocity value after offset removal is calculated as a change in shake angular velocity in a direction opposite to a panning direction after the panning operation is stopped. This reverse shake appears as a so-called swing back motion in the captured image.

FIG. 10B illustrates an example of a waveform in the first embodiment. It is possible to prevent an erroneous estimation of the offset component during the panning operation through a process of delaying updating of the offset estimation due to the panning detection simultaneously with start of the panning operation. During the panning operation, a process of stopping the shake correction, causing the shake correction member to return to a reference position (a central position or the like), and restarting the shake correction immediately after the end of the panning operation is performed in order to prevent an end contact of a shake correction member (the correction lens or the like). In the first embodiment, the updating of the offset estimation value is stopped during the panning operation, and the offset updating is restarted from an end time point of the panning operation. Therefore, since the reverse shake does not occur in the angular velocity signal after offset removal immediately after the panning operation ends, it is possible to prevent swing back due to the reverse shake.

In the first embodiment, the shake signal of the imaging device is separated into a plurality of components of amounts of shake in different frequency bands, magnitudes of the plurality of frequency components are determined, and the updating speed of the offset estimation is controlled on the basis of information on a result of determining the imaging situation. Control is performed to change the characteristics into characteristics for delaying the updating of the offset estimation value as a component of the amount of high frequency shake becomes larger or into the characteristics for advancing the updating of the offset estimation value as the component of the mount of low frequency shake becomes larger. Therefore, the offset component can be accurately estimated irrespective of an imaging state. According to the first embodiment, stable image blur correction can be realized in a wide frequency band even when a large shake occurs due to panning or the like.

Second Embodiment

Figure 11:
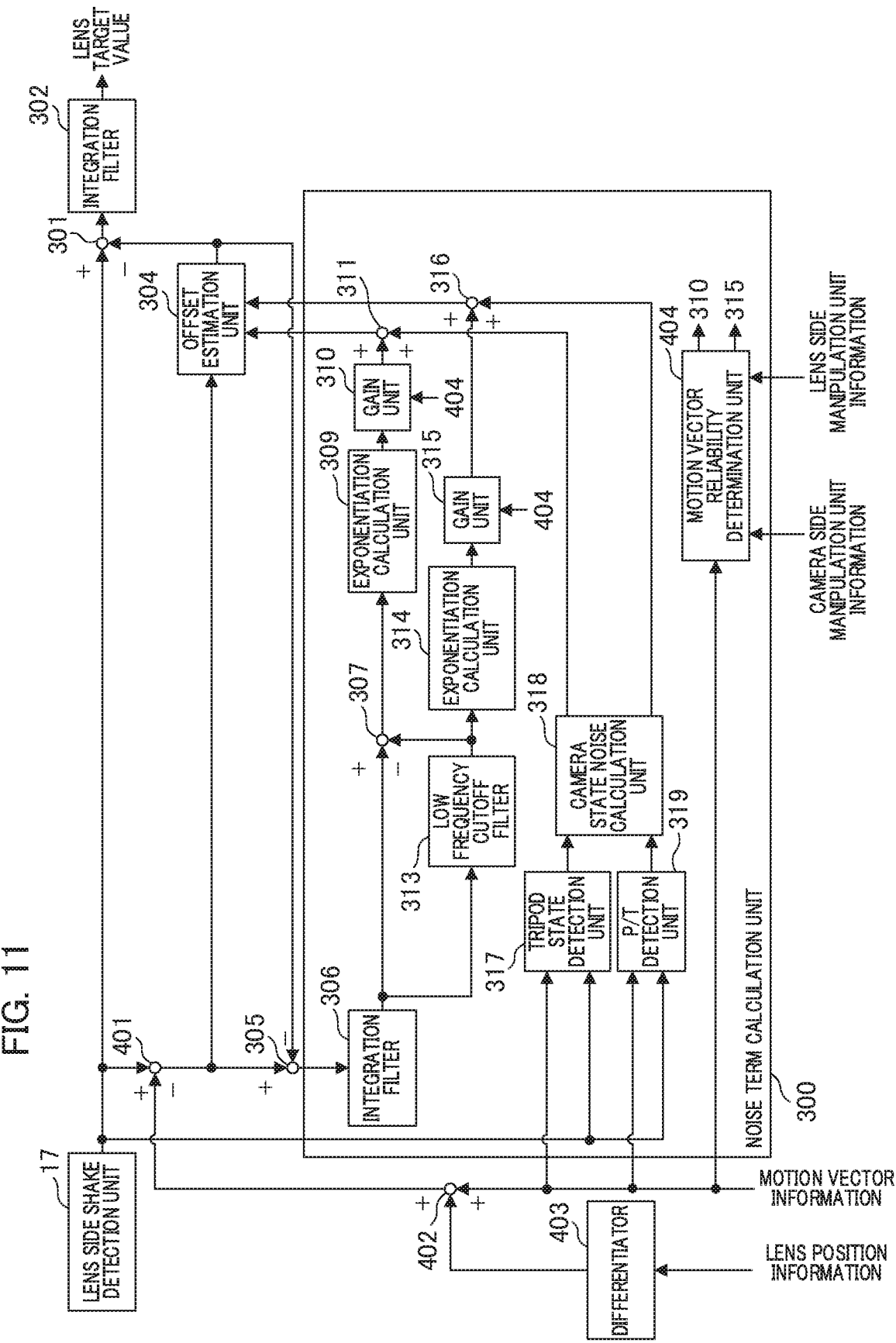
FIG. 11 is a block diagram illustrating a configuration of an image blur correction control unit according to a second embodiment.

Next, a second embodiment will be described. In the second embodiment, only configurations and processing units different from those of the first embodiment will be described, and description of repeated portions will be omitted. FIG. 11 is a block diagram illustrating a configuration regarding image blur correction control of a lens control unit 15 according to the second embodiment. In the first embodiment, the method of improving the accuracy of offset estimation by removing main frequency components generated due to hand shake among the amount of shake from the shake detection unit 17 using the band limiting filter 303 has been described. The second embodiment is different from the first embodiment in the following points. There is no band limiting filter 303.

Motion vector information, and a differential value of the detection position of the correction lens unit 19 are subtracted from the amount of shake input to the offset estimation unit.

A motion vector reliability determination unit 404 is provided.

The position information detected by the lens position detection unit 20 is differentiated by a differentiator 403, and lens speed information is output to the adder 402. Further, the motion vector information calculated by the motion vector calculation unit 7a is input to the adder 402. The adder 402 outputs a result of addition of the lens speed information and the motion vector information to the adder 401. The adder 401 subtracts a signal corresponding to the lens speed information and the motion vector information output by the adder 402 from the shake detection signal of the shake detection unit 17, and outputs a result of the subtraction to the offset estimation unit 304 and the adder 305.

The motion vector reliability determination unit (hereinafter simply referred to as a reliability determination unit) 404 determines the reliability of the motion vector. This determination is performed on the basis of the calculated motion vector, image processing information to be described below, and setting information for imaging set by the camera side manipulation unit 9 and the lens side manipulation unit 16. The reliability determination unit 404 sets respective gain values of the gain unit 310 and the gain unit 315 to predetermined values according to information on the determined reliability. That is, both the gain unit 310 and the gain unit 315 are variable gain units, and determine magnitudes of the system noise and the observed noise that are used for offset estimation in the offset estimation unit 304, respectively.

Figure 12:
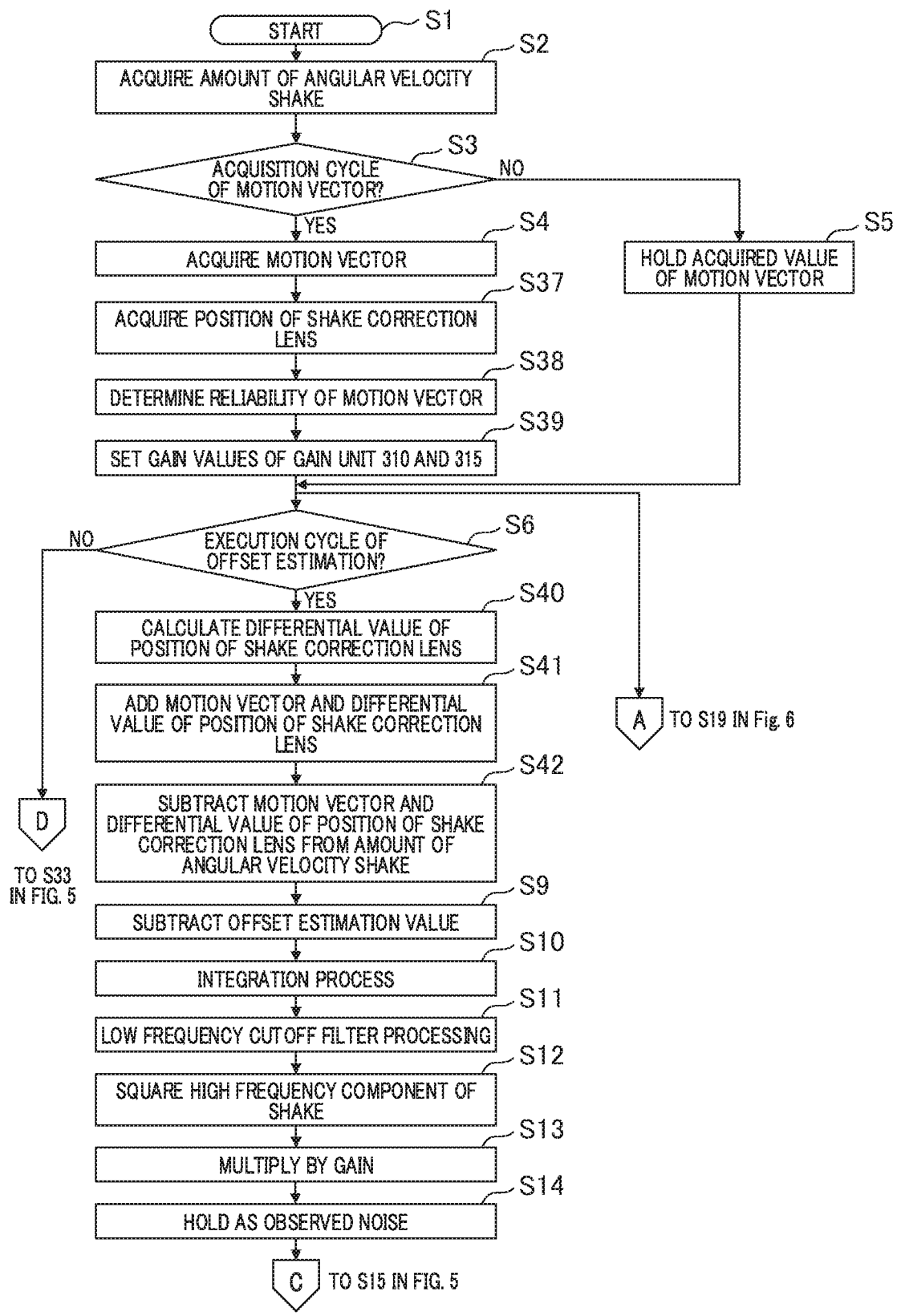
FIG. 12 is a flowchart illustrating target value calculation according to the second embodiment.

The target value calculation process in the imaging device will be described with reference to the flowchart of FIG. 12. Only portions different from those in FIG. 4 will be described, and description of the processes of FIG. 5 and FIG. 6 will be omitted. In S37 subsequent to S4, the detection position of the correction lens unit 19 is acquired by the lens position detection unit 20. Since the lens speed information is added to the motion vector information and used, the lens control unit 15 sets an acquisition cycle to be equal to or more than the acquisition cycle of the motion vector determined in S3. In S38, the reliability determination unit 404 determines reliability of the motion vector on the basis of the calculated motion vector, the image processing information, and the setting information for imaging set by the camera side manipulation unit 9 and the lens side manipulation unit 16. In S39, the reliability determination unit 404 sets the gain values of the gain unit 310 and the gain unit 315 to predetermined values according to reliability information of the motion vector.

In S6, the lens control unit 15 determines whether or not the current time point is a time point corresponding to the execution cycle of the offset estimation process. If the lens control unit 15 determines that the current time point is the time point corresponding to the execution cycle of the offset estimation process, the lens control unit 15 proceeds to S40. In S40, the differentiator 403 calculates a differential value of the detection position of the correction lens unit 19 acquired by the lens position detection unit 20. The offset estimation process is executed at a predetermined discrete timing that has been set in advance. Therefore, in a differentiation calculation in S40, a difference between the correction lens position acquired at a time point one cycle before and the correction lens position acquired at a time point at the current cycle is calculated. A result of calculating the difference between the positions of the correction lens unit 19 represents a driving speed (correction lens speed) of the correction lens unit 19 that is driven through the image blur correction.

If the image blur correction operation is being performed by the image blur correction unit 18, the adder 402 adds the calculated motion vector and the correction lens speed which is a position differential value of the correction lens unit 19 in S41. In this process, a shake speed of the imaging device 1 is calculated by summing the shake speed corrected through the image blur correction and a remaining shake speed detected by the motion vector. Further, if the image blur correction is not performed, the correction lens speed becomes zero, and therefore, the motion vector information directly represents a detection result of the shake of the imaging device 1 even when the correction lens speed is not necessarily added.

Here, since the motion vector is information obtained by detecting an amount of movement of an image on an imaging plane, strictly, the motion vector includes an influence of a shift shake or the like in addition to an angular shake of the imaging device 1. However, the influence of the angular shake is dominant in the amount of movement observed on the imaging plane under imaging conditions in which the influence of the shift shake is small. Under such conditions, the shake speed corrected through the image blur correction and the remaining shake speed detected by the motion vector are summed and used as the shake speed of the imaging device 1. By using the shake speed of the imaging device 1 calculated using the motion vector, it is possible to accurately detect the shake itself of the imaging device 1 with a smaller offset error than the shake detection unit 17. In S42, the adder 401 subtracts the shake speed of the imaging device 1 (the output signal of the adder 402) from the shake detection signal of the shake detection unit 17. Thus, it is possible to accurately separate the offset component of the shake detection unit 17.

In the first embodiment, a method of reducing the influence by attenuating a specific frequency component with respect to the shake of the imaging device 1 using the notch filter has been adopted. In the second embodiment, by accurately separating the offset component of the shake detection unit 17 using the motion vector, it is possible to further improve the accuracy of the estimation of the offset component. However, in the calculation of the motion vector, since the image before one or more frame of the acquired image is compared with the image acquired at the current time point for calculation of the image shift, the motion vector cannot be calculated if the image information cannot be acquired. According to the imaging conditions, an amount of blur in the captured image may be large and the calculated motion vector may not be correct. In such a case, the method of the first embodiment is used. It should be noted that various methods are known for a method of calculating the reliability, and any method can be adopted in the second embodiment.

If the motion vector information cannot be obtained according to the imaging conditions or a case in which the motion vector information cannot be acquired correctly according to the imaging condition as described below, the reliability determination unit 404 determines the reliability of the motion vector information. According to a result of the determination of the reliability, a process of changing the magnitude of the system noise and the observed noise that is used for offset estimation is performed. A relationship between the reliability of the motion vector and the magnitude of the system noise and the observed noise used for offset estimation will be described with reference to FIG. 13.

Figure 13A:
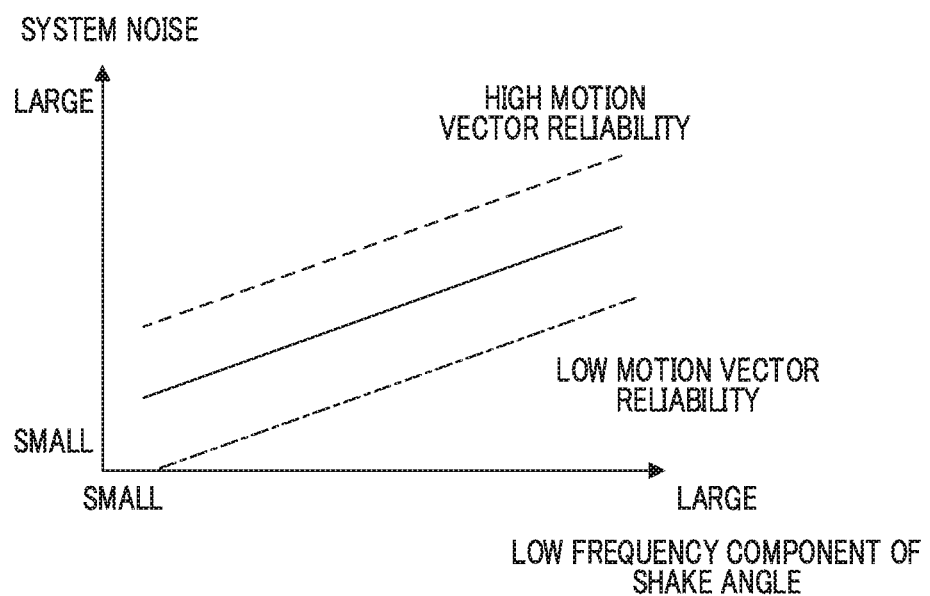
FIGS. 13A to 13B are diagrams illustrating a relationship between reliability of a motion vector, system noise, and observed noise.
Figure 13B:
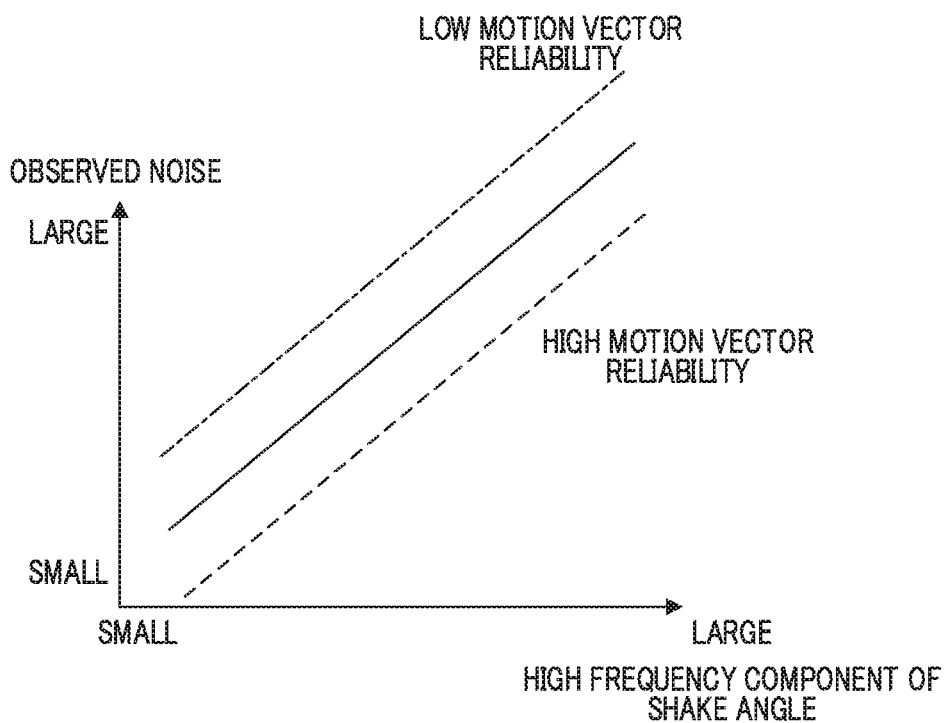

FIG. 13A is a diagram illustrating a relationship between a magnitude of the low frequency component of the shake angle signal for noise calculation calculated by the gain unit 310 on a horizontal axis and a system noise on a vertical axis. FIG. 13B is a diagram illustrating a relationship between a magnitude of the high frequency component of the shake angle signal for noise calculation calculated by the gain unit 315 on a horizontal axis and observed noise on a vertical axis. A graph indicated by a solid line represents the magnitude of the system noise and the observed noise in the first embodiment. A graph indicated by a dotted line represents the magnitude of the system noise and the observed noise if it is determined that the reliability of the motion vector is high. A graph indicated by a dash-dotted line represents the magnitude of the system noise and the observed noise if it is determined that the reliability of the motion vector is low.

When the reliability of the motion vector is high, the system noise is set to be larger and the observed noise is set to be smaller with respect to the same shake angle signal value for noise calculation, as compared with a case in which the reliability is low. When the reliability is high, it is possible to accurately detect the shake of the imaging device 1 that is calculated by the adder 401. By subtracting the shake of the imaging device 1 calculated using the motion vector from the amount of shake including the shake at the time of an imaging operation detected by the shake detection unit 17, it is possible to accurately separate the offset component of the shake detection unit 17. Therefore, a frequency component of the offset component of the shake detection unit 17 can be extracted with respect to the observed amount of shake $z_t$ that is input to the Kalman filter in Equation (13). Therefore, by increasing the system noise or decreasing the observed noise, correction is performed so that the Kalman gain approaches 1 and the offset estimation value approaches the observed amount of shake.

On the other hand, if the reliability of the motion vector is low, the system noise is set to be smaller and the observed noise is set to be larger for the same shake angle signal value for noise calculation, as compared with the case in which the reliability is high. If the reliability is low, an error is large in the shake of the imaging device 1 calculated by the adder 401, and accurate detection cannot be performed. Therefore, when the shake of the imaging device 1 calculated using the motion vector is subtracted from the amount of shake including the shake at the time of the imaging operation detected by the shake detection unit 17, a shake signal with a superimposed motion vector detection error other than the offset component of the shake detection unit 17 is obtained. A process of decreasing the system noise or increasing the observed noise to cause the Kalman gain to approach zero and to delay the updating of the offset estimation value in Equation (13) is executed. Alternatively, it is possible to improve the updating speed and the accuracy of the offset estimation value through restriction such that updating is not performed.

Next, conditions for a reliability determination of the motion vector in the reliability determination unit 404 will be described.

A case in which a moving object area corresponding to a moving subject occupies a predetermined value or more with respect to an entire captured image An object of the second embodiment is to detect the shake of the imaging device 1 using the motion vector. However, when a moving object area occupies an entire captured image, a moving speed of the moving subject is detected as the motion vector. Therefore, the reliability determination unit 404 sets the reliability to be lower as a proportion of occupancy of the moving object area to the entire captured image becomes higher.

A case in which a set ISO sensitivity value that the photographer has set using the camera side manipulation unit 9 is higher than a predetermined value If the set ISO sensitivity value is high, a noise component is also amplified when an electric signal of the imaging unit is amplified. Accordingly, as an ISO sensitivity becomes higher, noise is mixed in the motion vector detected from the image and reliability of the motion vector is degraded. Therefore, the reliability determination unit 404 sets the reliability to be low as a set value of an imaging sensitivity of the imaging unit becomes higher.

A case in which a contrast value of the subject is lower than a predetermined value If a contrast value of the subject is small in a block matching process when the motion vector is calculated, it is difficult to determine a similar point of an image, and an error occurs in a matching result. Therefore, the reliability determination unit 404 sets the reliability to be lower as the contrast value of the subject becomes smaller.

A case in which the subject area having a repetitive pattern occupies a predetermined value or more with respect to the entire captured image When a periodic pattern (a repetitive pattern such as a striped pattern) is present in the captured image and occupies the entire image on the imaging plane, an erroneous motion vector may be detected through the block matching process. Therefore, the reliability determination unit 404 sets the reliability to be lower as a proportion of occupancy of the periodic pattern in the entire area of the captured image becomes higher.

A case in which a difference between a distance from the imaging device to a first subject and a distance from the imaging device to a second subject at a distance different from the first subject is equal to or greater than a predetermined value and subject areas thereof occupy a predetermined value or more with respect to the entire captured image A relationship between an amount of motion of the image on the imaging plane and an actual movement speed of the subject differs according to the distance from the imaging device to the subject. Therefore, if a subject to which a distance from the imaging device is large and a subject to which a distance from the imaging device is small are both present in an image that is used for detection of the motion vector and subject areas occupies a predetermined value or more with respect to the entire captured image, an error may occur between the motion vectors. Therefore, if the difference between the distance from the imaging device to the first subject and the distance from the imaging device to the second subject is equal to or greater than the predetermined value, the reliability determination unit 404 sets the reliability to be lower as a proportion of occupancy of the subject area in the entire captured image becomes higher.

A case in which an amount of rolling shutter distortion is larger than a predetermined value If the imaging unit includes a complementary metal oxide semiconductor (CMOS) image sensor, a difference is generated between images due to a capturing time difference if a subject moving at a high speed is imaged, and a distortion occurs when the subject moving at a high speed is imaged as a moving image. If the motion vector has been detected using a distorted image, an error may occur in detection of the motion vector. Therefore, the reliability determination unit 404 sets the reliability to be lower as the amount of rolling shutter distortion of the captured image becomes larger.

A case in which a maximum value of a correlation value of a texture of a subject is low When the maximum value of the correlation value between a reference area and a search area of matching at the time of detecting the motion vector is low, a degree of similarity between the reference area and the search area is considered to be low and the reliability is determined to be low. The reliability determination unit 404 sets the reliability to be lower as the maximum value of the correlation value of the texture of the subject becomes smaller.

A case in which a ratio of a difference between the maximum value and a minimum value of the correlation value of the texture of the subject to a difference between the maximum value and an average value of the correlation value is small The ratio of the difference between the maximum value and the minimum value of the correlation value to the difference between the maximum value and the average value indicates steepness of a peak of the correlation value. If the ratio is small, the degree of similarity between the reference area and the search area is considered to be low and the reliability is determined to be low. The reliability determination unit 404 sets the reliability to be low as the ratio of the difference between the maximum value and the minimum value of the correlation value of the texture of the subject to the difference between the maximum value and the average value of the correlation value becomes smaller. It should be noted that a method of calculating the correlation value includes a method using a sum of absolute difference, but any calculation method may be used.

Figure 14:
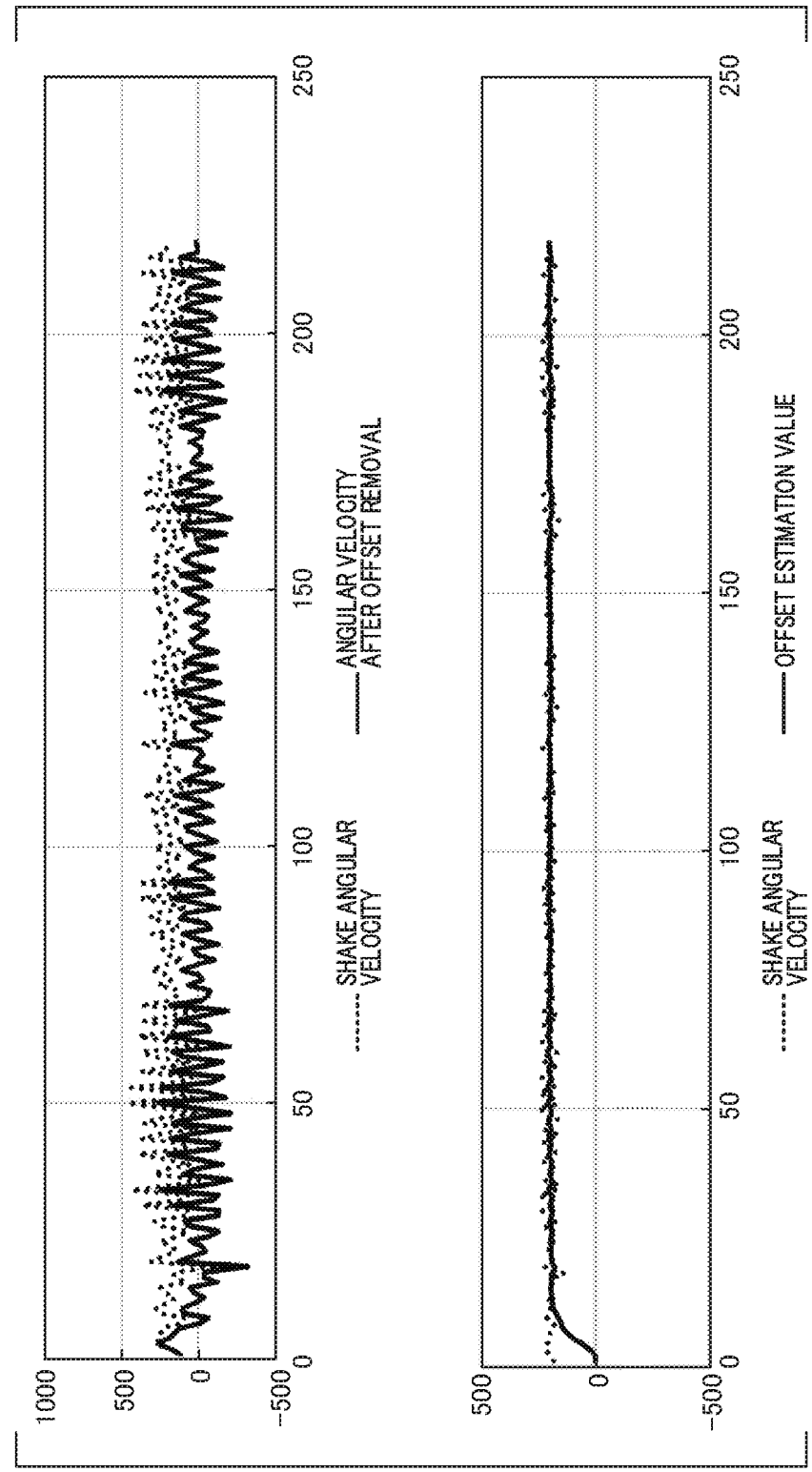
FIG. 14 is a diagram illustrating a relationship between an angular velocity output and an offset estimation value in a tripod detection state.
Figure 15:
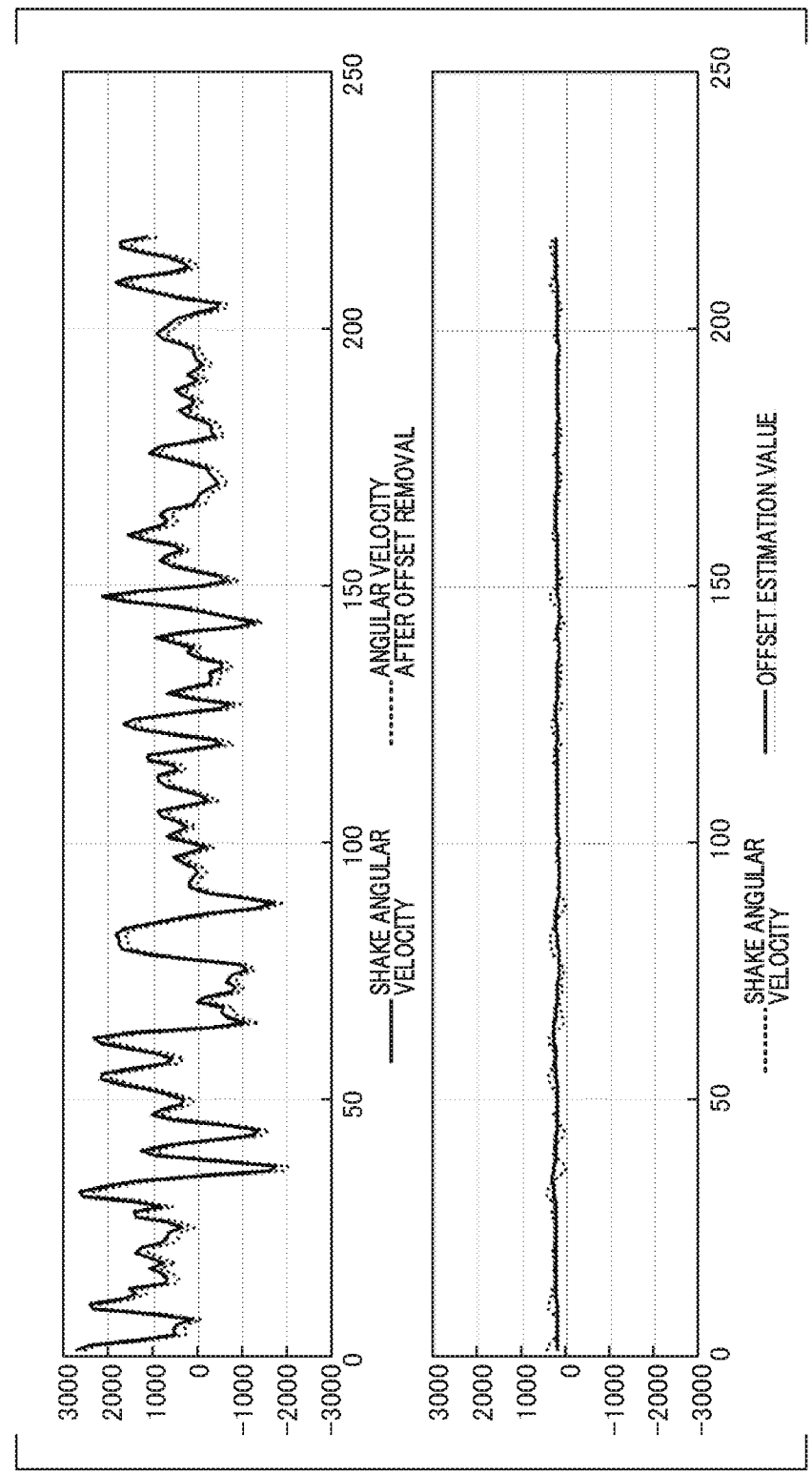
FIG. 15 is a diagram illustrating a relationship between an angular velocity output and an offset estimation value in a hand held state.
Figure 16:
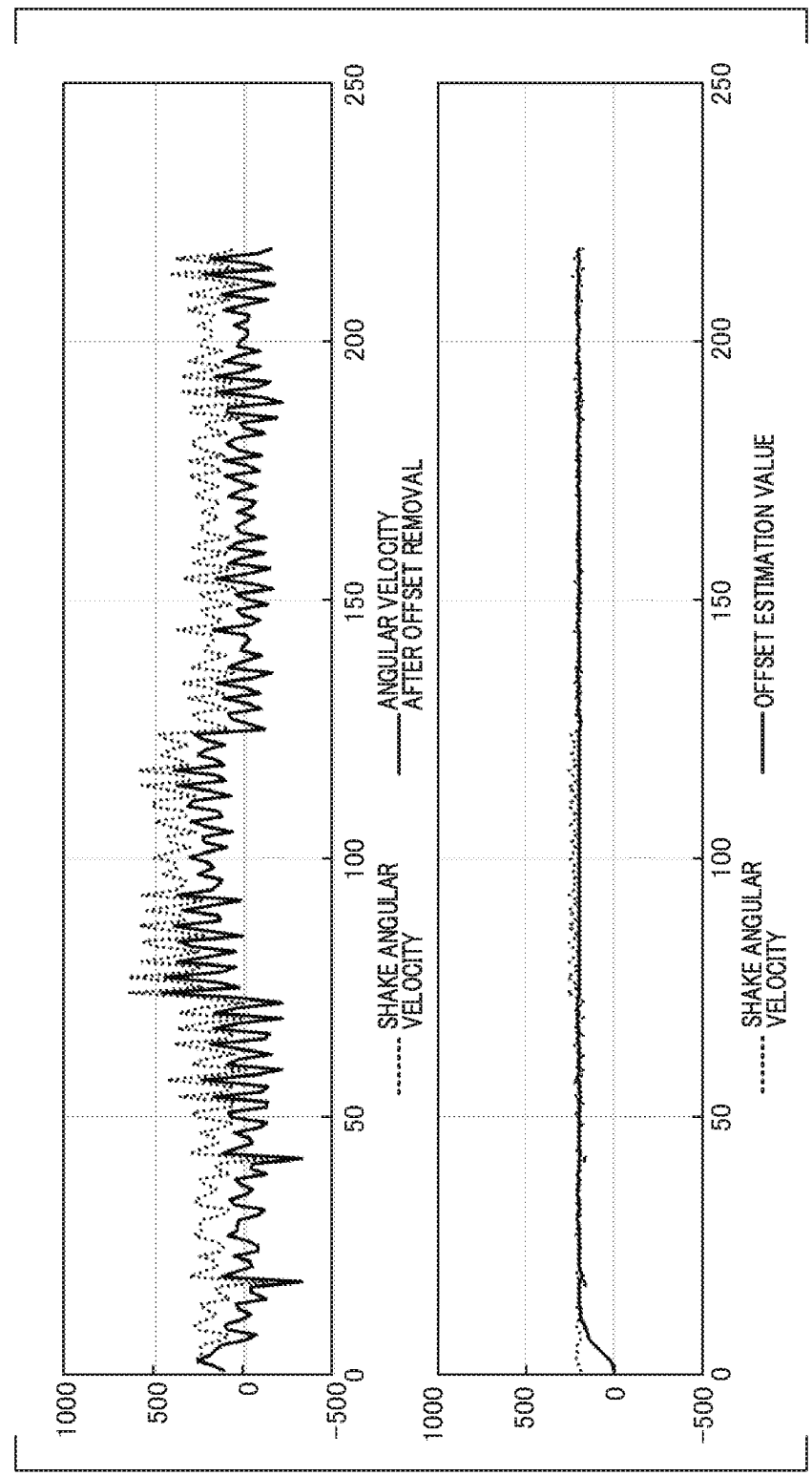
FIG. 16 is a diagram illustrating a relationship between an angular velocity output and an offset estimation value at the time of a panning operation.

FIGS. 14, 15, and 16 illustrate examples of a time series change in the angular velocity of the shake and the offset estimation value of the offset estimation unit 304. Assumed imaging situations of each waveform correspond to FIGS. 8, 9, and 10, respectively. In FIG. 14, when the motion vector reliability is high, a shake frequency component due to imaging is removed from the value of the shake angular velocity that is that is used for offset estimation in advance, as shown in the lower part of FIG. 14. In the second embodiment, since the system noise can be set to be large and the observed noise can be sent to be small, it is possible to advance the updating of the offset estimation value, as compared with the first embodiment. The same effect can also be obtained in FIG. 15.

In FIG. 16, a change in the angular velocity during a panning operation is detected using the motion vector and removed from the shake angular velocity that is that is used for offset estimation. Therefore, it is possible to further improve accuracy of the offset estimation, as compared with the first embodiment.

In the second embodiment, it is possible to more accurately separate the shake component of the imaging device and the offset component of the output of the shake detection unit using the motion vector, and to improve the updating speed and the estimation accuracy of the offset estimation.

In the embodiments, the device that performs image blur correction through movement control of the correction lens of the imaging optical system has been described. The present invention is not limited thereto and can be applied to a device that performs image blur correction through movement control of an image sensor or a device that performs image blur correction in combination of the movement control of the correction lens and the movement control of the image sensor.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

This application claims the benefit of Japanese Patent Application No. 2018-6640, filed Jan. 18, 2018 which is hereby incorporated by reference in its entirety.

What is claimed is:

1. An image blur correction device comprising:
at least one processor and at least one memory functioning as:
an estimation unit configured to estimate an offset component of an output of a shake detection unit configured to detect a shake of an imaging device;
a changing unit configured to calculate first and second amounts of shake that are a plurality of components in frequency bands on the basis of the output of the shake detection unit, and change characteristics of the estimation unit according to the first and second amounts of shake; and
a control unit configured to perform image blur correction using an output obtained by subtracting the offset component estimated by the estimation unit from the output of the shake detection unit,
wherein the changing unit changes the characteristics of the estimation unit into characteristics for delaying updating of an estimation value of the offset component of the estimation unit as the first amount of shake becomes larger, or changes the characteristics of the estimation unit into characteristics for advancing the updating of the estimation value of the offset component of the estimation unit as the second amount of shake that is a lower frequency component than the first amount of shake becomes larger.

2. The image blur correction device according to claim 1, wherein the changing unit acquires a second signal obtained by subtracting the estimation value of the offset component of the estimation unit from a first signal that is detected by the shake detection unit, and separates the second signal into components in different frequency bands to calculate the first and second amounts of shake.

3. The image blur correction device according to claim 1, further comprising a filter that performs band limiting in a predetermined frequency band on a first signal that is detected by the shake detection unit,
wherein the changing unit acquires a second signal obtained by subtracting the estimation value of the offset component of the estimation unit from a third signal of which a band has been limited by the filter.

4. The image blur correction device according to claim 1, wherein when a stationary state of the imaging device is detected, the changing unit changes the characteristics of the estimation unit into characteristics for advancing updating of the estimation value of the offset component of the estimation unit as the shake of the imaging device becomes smaller.

5. The image blur correction device according to claim 1, wherein when panning or tilting of the imaging device is detected, the changing unit changes the characteristics of the estimation unit into characteristics for delaying updating of the estimation value of the offset component of the estimation unit as a shake of the imaging device becomes larger.

6. The image blur correction device according to claim 4, further comprising:
a first detection unit configured to detect a motion vector from a plurality of captured images; and
a second detection unit configured to detect a stationary state of the imaging device using the output of the shake detection unit and the motion vector.

7. The image blur correction device according to claim 5, further comprising:
a first detection unit configured to detect a motion vector from a plurality of captured images; and
a second detection unit configured to detect a panning or tilting state of the imaging device using the output of the shake detection unit and the motion vector.

8. The image blur correction device according to claim 1, further comprising:
a detection unit configured to detect a motion vector from a plurality of captured images, and
the estimation unit estimates the offset component using the output obtained by subtracting the motion vector from the output of the shake detection unit.

9. The image blur correction device according to claim 8, wherein the changing unit determines reliability of the motion vector and changes an updating speed of the estimation value of the offset component of the estimation unit.

10. The image blur correction device according to claim 9, wherein the changing unit sets the reliability to be lower as a proportion of occupancy of a moving object area corresponding to a moving subject in the entire captured image becomes higher in the captured image.

11. The image blur correction device according to claim 9, wherein the changing unit sets the reliability to be lower as a set value of an imaging sensitivity becomes higher.

12. The image blur correction device according to claim 9, wherein the changing unit sets the reliability to be lower as a contrast value of the subject becomes smaller.

13. The image blur correction device according to claim 9, wherein an area having a periodic pattern is present in the captured image, and the changing unit sets the reliability to be lower as a proportion of occupancy of the area in the entire captured image is larger.

14. The image blur correction device according to claim 9, wherein if a difference between a distance from the imaging device to a first subject and a distance from the imaging device to a second subject is equal to or greater than a predetermined value, the changing unit sets the reliability to be lower as a proportion of occupancy of areas of the first and second subject in the entire captured image becomes higher.

15. The image blur correction device according to claim 9, wherein the changing unit sets the reliability to be low as an amount of rolling shutter distortion of a captured image becomes larger.

16. The image blur correction device according to claim 9, wherein the changing unit sets the reliability to be lower as a maximum value of a correlation value of a texture of a subject becomes smaller.

17. The image blur correction device according to claim 9, wherein the changing unit sets the reliability to be lower as a ratio of a difference between a maximum value and a minimum value of a correlation value of a texture of a subject to a difference between the maximum value and an average value of the correlation value becomes smaller.

18. The image blur correction device according to claim 9, wherein if the reliability of the motion vector is low, the changing unit performs a process of delaying the updating of the estimation value or a process of limiting the updating, as compared with a case in which the reliability of the motion vector is high.

19. An imaging device comprising:
at least one processor and at least one memory functioning as:
an estimation unit configured to estimate an offset component of an output of a shake detection unit configured to detect a shake of the imaging device;
a changing unit configured to calculate first and second amounts of shake that are a plurality of components in frequency bands on the basis of the output of the shake detection unit, and change characteristics of the estimation unit according to the first and second amounts of shake; and
a control unit configured to perform image blur correction using an output obtained by subtracting the offset component estimated by the estimation unit from the output of the shake detection unit,
wherein the changing unit changes the characteristics of the estimation unit into characteristics for delaying updating of an estimation value of the offset component of the estimation unit as the first amount of shake becomes larger, or changes the characteristics of the estimation unit into characteristics for advancing the updating of the estimation value of the offset component of the estimation unit as the second amount of shake that is a lower frequency component than the first amount of shake becomes larger.

20. A method of controlling an image blur correction device, the method comprising:
estimating an offset component of an output of a shake detection unit configured to detect a shake of an imaging device;
calculating first and second amounts of shake that are a plurality of components in frequency bands on the basis of the output of the shake detection unit and changing estimation characteristics according to the first and second amounts of shake; and
performing image blur correction using an output obtained by subtracting the estimated offset component from the output of the shake detection unit,
wherein the changing of the estimation characteristics includes changing the estimation characteristics into characteristics for delaying updating of an estimation value of the offset component as the first amount of shake becomes larger, or changing the estimation characteristics into characteristics for advancing the updating of the estimation value of the offset component as the second amount of shake that is at a lower frequency than the first amount of shake becomes larger.

* * * * *